(12) United States Patent
Diar Bakerly et al.

(10) Patent No.: US 11,912,584 B2
(45) Date of Patent: Feb. 27, 2024

(54) ALUMINA PRODUCTS AND USES THEREOF IN POLYMER COMPOSITIONS WITH HIGH THERMAL CONDUCTIVITY

(71) Applicant: MARTINSWERK GMBH, Bergheim (DE)

(72) Inventors: Bashar Diar Bakerly, Cologne (DE); Henning Hofius, Aachen (DE); Martijn Jacobus Marinus Mies, PJ Eindhoven (NL); Monika Giesselbach, Frechen (DE)

(73) Assignee: MARTINSWERK GMBH, Bergheim (DE)

( * ) Notice: Subject to any disclaimer, the term of this patent is extended or adjusted under 35 U.S.C. 154(b) by 182 days.

(21) Appl. No.: 17/183,434

(22) Filed: Feb. 24, 2021

(65) Prior Publication Data
US 2021/0179439 A1    Jun. 17, 2021

Related U.S. Application Data

(62) Division of application No. 16/095,405, filed as application No. PCT/EP2017/061601 on May 15, 2017, now Pat. No. 10,968,111.
(Continued)

(51) Int. Cl.
*C01F 7/02* (2022.01)
*C08K 9/06* (2006.01)
(Continued)

(52) U.S. Cl.
CPC ............... *C01F 7/023* (2013.01); *C01F 7/02* (2013.01); *C01F 7/021* (2013.01); *C08K 9/06* (2013.01);
(Continued)

(58) Field of Classification Search
CPC ........ C01F 7/02; C01F 7/021; C01P 2004/51; C01P 2004/54; C01P 2004/61;
(Continued)

(56) References Cited

U.S. PATENT DOCUMENTS

| 3,826,775 A | 7/1974 | Sobolev et al. |
| 5,340,781 A | 8/1994 | Oda et al. |

(Continued)

FOREIGN PATENT DOCUMENTS

| CN | 104497490 | 4/2015 |
| EP | 4 995 85 | 8/1992 |

(Continued)

OTHER PUBLICATIONS

Machine translation of Mori (JP10237311 A), publication date Sep. 8, 1998.*

(Continued)

*Primary Examiner* — Jun Li
(74) *Attorney, Agent, or Firm* — Merchant & Gould P.C.

(57) ABSTRACT

Alumina products containing a fine particle size component and a coarse particle size component, and with specific particle size characteristics and irregular and non-spherical particle shapes, are disclosed. These alumina products can be used in polymer formulations to produce composites having high isotropic thermal conductivity.

29 Claims, 20 Drawing Sheets

Related U.S. Application Data

(60) Provisional application No. 62/336,781, filed on May 16, 2016.

(51) Int. Cl.
  *C08L 23/08* (2006.01)
  *C01F 7/023* (2022.01)
  *C01F 7/021* (2022.01)
  *C08K 3/22* (2006.01)
  *C08L 23/06* (2006.01)

(52) U.S. Cl.
  CPC ....... *C08L 23/0846* (2013.01); *C08L 23/0853* (2013.01); *C01P 2004/51* (2013.01); *C01P 2004/54* (2013.01); *C01P 2004/61* (2013.01); *C01P 2004/62* (2013.01); *C01P 2004/90* (2013.01); *C01P 2006/11* (2013.01); *C01P 2006/12* (2013.01); *C01P 2006/80* (2013.01); *C08K 2003/2227* (2013.01); *C08K 2201/001* (2013.01); *C08K 2201/005* (2013.01); *C08K 2201/016* (2013.01); *C08L 23/06* (2013.01)

(58) Field of Classification Search
  CPC ......... C01P 2004/62; C08K 2003/2227; C08L 23/0846; C08L 23/0853
  See application file for complete search history.

(56) References Cited

U.S. PATENT DOCUMENTS

| | | | |
|---|---|---|---|
| 5,543,173 | A | 8/1996 | Horn, Jr. et al. |
| 5,609,675 | A | 3/1997 | Noritake et al. |
| 5,929,138 | A | 7/1999 | Mercer et al. |
| 5,935,550 | A | 8/1999 | Mohri et al. |
| 6,500,891 | B1 | 12/2002 | Kropp et al. |
| 8,945,517 | B2 | 2/2015 | Hagar et al. |
| 10,968,111 | B2 | 4/2021 | Hofius et al. |
| 2003/0125418 | A1 | 7/2003 | Shibusawa et al. |
| 2004/0009120 | A1 | 1/2004 | Kanbara et al. |
| 2004/0249019 | A1 | 12/2004 | Meyer et al. |
| 2005/0035230 | A1 | 2/2005 | Kanbara et al. |
| 2005/0182172 | A1 | 8/2005 | Kamimura et al. |
| 2005/0256259 | A1 | 11/2005 | Goto et al. |
| 2006/0047045 | A1 | 3/2006 | Oda et al. |
| 2006/0058426 | A1 | 3/2006 | Oda et al. |
| 2006/0167157 | A1 | 7/2006 | Takahashi et al. |
| 2006/0189740 | A1* | 8/2006 | Kamimura ............ C04B 35/628 423/625 |
| 2007/0021292 | A1 | 1/2007 | Maki et al. |
| 2007/0183965 | A1 | 8/2007 | Miyazawa et al. |
| 2008/0021146 | A1 | 1/2008 | Komatsu et al. |
| 2008/0039555 | A1 | 2/2008 | Ruyters et al. |
| 2009/0062449 | A1 | 3/2009 | Wang |
| 2009/0188701 | A1 | 7/2009 | Tsuzuki et al. |
| 2009/0253846 | A1 | 10/2009 | Fukui |
| 2010/0040535 | A1 | 2/2010 | Azima et al. |
| 2010/0051855 | A1 | 3/2010 | Kunitomo et al. |
| 2010/0061924 | A1 | 3/2010 | Herbiet et al. |
| 2011/0009544 | A1 | 1/2011 | Funahashi |
| 2011/0046267 | A1 | 2/2011 | Tanaka et al. |
| 2011/0256051 | A1 | 10/2011 | Sawano et al. |
| 2014/0249058 | A1 | 9/2014 | Wu et al. |
| 2014/0377561 | A1 | 12/2014 | Cassiano Gaspar et al. |
| 2015/0110985 | A1 | 4/2015 | Sakaguchi et al. |
| 2016/0030625 | A1* | 2/2016 | Mrozek ...................... C08J 9/28 521/64 |
| 2016/0215131 | A1* | 7/2016 | Adkinson .............. C08K 3/013 |
| 2017/0101519 | A1 | 4/2017 | Endtner et al. |

FOREIGN PATENT DOCUMENTS

| | | | |
|---|---|---|---|
| GB | 0197682 A2 * | 10/1986 | ............ C08F 299/06 |
| JP | S 62 191 420 | 8/1987 | |
| JP | S 63 156 011 | 6/1988 | |
| JP | H 01-217071 | 8/1989 | |
| JP | H 10 237 311 | 9/1998 | |
| JP | 2003/054941 | 2/2003 | |
| JP | 2003/137627 | 5/2003 | |
| JP | 2004/149687 | 5/2004 | |
| JP | 2004/244491 | 9/2004 | |
| JP | 2005/068258 | 3/2005 | |
| JP | 2005/146124 | 6/2005 | |
| JP | 2006/274154 | 10/2006 | |
| JP | 2007/277406 | 10/2007 | |
| JP | 2007/290876 | 11/2007 | |
| JP | 2011/098841 | 5/2011 | |
| JP | 2012/020900 | 2/2012 | |
| JP | 2012/214612 | 11/2012 | |
| JP | 2012/250869 | 12/2012 | |
| JP | WO2013/039103 | 3/2013 | |
| JP | 5 294 613 | 9/2013 | |
| JP | 5 310 419 | 10/2013 | |
| JP | 5 345 340 | 11/2013 | |
| JP | 2014/009140 | 1/2014 | |
| JP | 2014/193965 | 10/2014 | |
| KR | 10-2016-0065094 | 6/2016 | |
| WO | WO 2009/032212 | 3/2009 | |
| WO | WO 2009/136542 A1 | 11/2009 | |

OTHER PUBLICATIONS

International Search Report and Written Opinion of International Application No. PCT/EP2017/061601, dated Aug. 14, 2017.

Taruta et al., "Influence of coarse particle shape on packing and sintering of bimodal size-distributed alumina powder mixtures", Journal of Materials Science Letters, Jan. 1, 1993 (Jan. 1, 1993), pp. 424-426, XP055396275, Retrieved from the Internet: URL:https://rd.springer.com/content/pdf/10.1007/BF00609173.pdf.

Taruta et al., Effect of Additives on Packing and Sintering of Bimodal Size-Distributed Alumina Powder Mixtures, Key Engineering Materials, vols. 111-112, 1995 p. 322-340.

Shi et al., Compaction and Sintering Behavior of Bimodal Alumina Powder Suspensions by Pressure Filtration, J. Am. Ceram. Soc., 2000, 83 (4) p. 737-742.

German, Prediction of Sintered Density for Bimodal Powder Mixtures, Metallurgical Transactions A., vol. 23 A, May 1992, p. 1445-1465.

\* cited by examiner

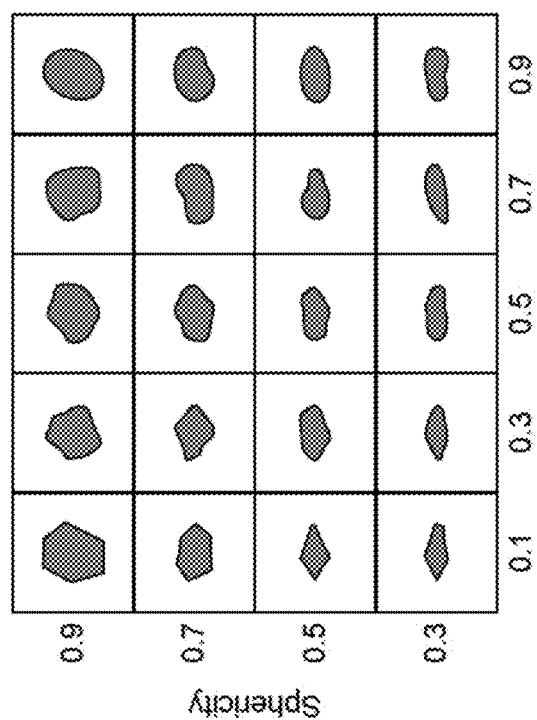
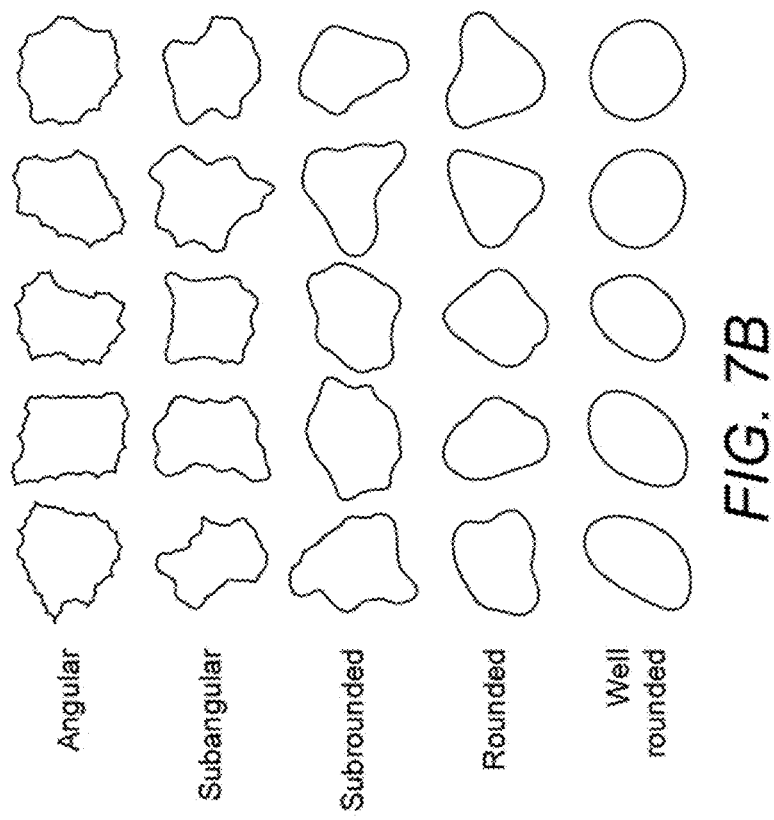
FIG. 7A
FIG. 7B

ALUMINA PRODUCTS AND USES THEREOF IN POLYMER COMPOSITIONS WITH HIGH THERMAL CONDUCTIVITY

REFERENCE TO RELATED APPLICATION

This application is a divisional application of U.S. patent application Ser. No. 16/095,405, filed on Oct. 22, 2018, now U.S. Pat. No. 10,968,111, which is a National Stage Application of International Patent Application No. PCT/EP2017/061601, filed on May 15, 2017, which claims the benefit of U.S. Provisional Application Ser. No. 62/336,781, filed on May 16, 2016, the disclosures of which are incorporated herein by reference in their entirety.

BACKGROUND OF THE INVENTION

The present invention is directed generally to alumina products with specific particle size characteristics. These alumina products can be used in polymer formulations to produce composites having high isotropic thermal conductivity.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

An alumina product in accordance with one aspect of this invention can have a fine particle size component and a coarse particle size component, and the alumina product can be characterized by a d50 particle size in a range from about 1 to about 20 µm, and a d90 particle size in a range from about 5 to about 50 µm. In another aspect, the alumina product can be characterized by a d50 particle size in a range from about 1 to about 5 µm, and a d90 particle size in a range from about 6 to about 40 µm. Yet, in another aspect, the alumina product can be characterized by a d50 particle size in a range from about 1.5 to about 5 µm, and a d90 particle size in a range from about 6 to about 30 µm.

In other aspects of this invention, the alumina product can have a fine particle size component and a coarse particle size component, and the fine particle size component can have a d50 particle size in a range from about 0.3 to about 6 µm, and the coarse particle size component can have a d50 particle size in a range from about 3 to about 35 µm. In further aspects, the fine particle size component can have a d50 particle size in a range from about 0.8 to about 3.5 µm (or from about 1.5 to about 4.5 µm), and the coarse particle size component can have a d50 particle size in a range from about 10 to about 30 µm (or from about 12 to about 22 µm). Generally, the amount of the fine particle size component in the alumina product can range from about 10 to about 90 wt. %, from about 20 to about 80 wt. %, or from about 40 to about 80 wt. %, based on the total weight of the fine particle size component and the coarse particle size component.

Consistent with aspects of this invention, the particles of the alumina product can be described as irregularly shaped and non-spherical. Often, although not required, the particles are surface treated, resulting in tighter packing and improved polymer compatibility. Polymer compositions also are provided herein, and such compositions can comprise a polymer and any of the alumina products disclosed herein. The resultant polymer compositions can have unexpectedly high isotropic thermal conductivity, as well as low viscosity and high tensile elongation properties.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

FIG. 7A presents a pictorial representation of particle sphericity and particle roundness classifications.

FIG. 7B presents a pictorial representation of particle roundness categories, ranging from angular particles to well-rounded particles.

DEFINITIONS

Figure 1:
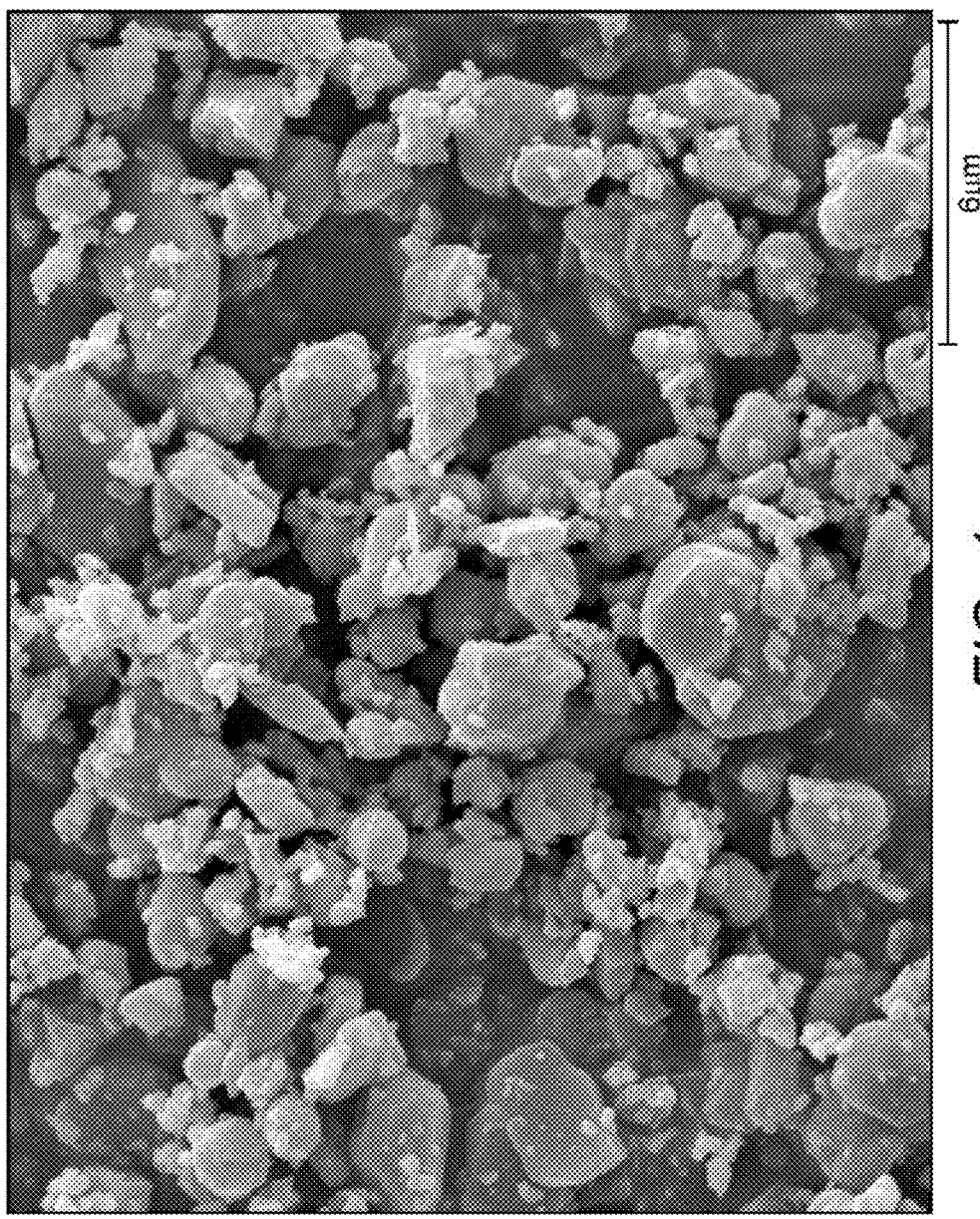
FIG. 1 presents a scanning electron micrograph of the fine particle size component used in the alumina product of Example 1.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter can be described such that, within particular aspects, a combination of different features can be envisioned. For each and every aspect and each and every feature disclosed herein, all combinations that do not detrimentally affect the designs, compositions, processes, or methods described herein are contemplated and can be interchanged, with or without explicit description of the particular combination. Accordingly, unless explicitly recited otherwise, any aspect or feature disclosed herein can be combined to describe inventive designs, compositions, processes, or methods consistent with the present disclosure.

While compositions and methods are described herein in terms of "comprising" various components or steps, the compositions and methods can also "consist essentially of" or "consist of" the various components or steps, unless stated otherwise. For example, polymer compositions consistent with aspects of the present invention can comprise; alternatively, can consist essentially of; or alternatively, can consist of; (1) a polymer, and (2) an alumina product.

The terms "a," "an," and "the" are intended to include plural alternatives, e.g., at least one, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, and so forth.

The term "contacting" is used herein to refer to materials or components which can be blended, mixed, slurried, dissolved, reacted, treated, compounded, or otherwise contacted or combined in some other manner or by any suitable method. The materials or components can be contacted together in any order, in any manner, and for any length of time, unless otherwise specified.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications and patents, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the d90 particle size of the alumina product can be in certain ranges in various aspects of this invention. By a disclosure that the d90 particle size can be in a range from about 5 to about 50 µm, the intent is to recite that the d90 can be any particle size within the range and, for example, can be equal to about 5, about 10, about 15, about 20, about 25, about 30, about 35, about 40, about 45, or about 50 µm. Additionally, the d90 particle size can be within any range from about 5 to about 50 µm (for example, from about 6 to about 30 µm), and this also includes any combination of ranges between about 5 and about 50 µm (for example, the d90 particle size can be in a range from 6 to about 10 µm or from about 16 to about 28 µm). Likewise, all other ranges disclosed herein should be interpreted in a manner similar to this example.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

Disclosed herein are alumina products with multimodal particle size distributions, and polymer compositions and articles of manufacture containing the alumina products.

Unexpectedly, it was found that alumina products containing non-spherical particles could achieve dense packing and could be filled into polymers at the same high loading amounts as those of spherical particles. While not wishing to be bound by the following theory, it is believed that these surprising benefits can be the result of the specific particle size distributions of the non-spherical alumina products disclosed herein, the irregular and non-spherical shape of the calcined alumina particles, and their surface treatment or coating configured to improve packing and polymer compatibility.

Moreover, it was found that polymer compositions containing the non-spherical alumina products disclosed herein, despite high alumina loadings (e.g., from 80 wt. % up to 92-93 wt. %), resulted in low viscosity and good processability, as well as excellent polymer mechanical properties, such as tensile elongation at break. In addition, and beneficially, high isotropic thermal conductivities of the polymer compositions also were achieved. Furthermore, and while not wishing to be bound by the following theory, it is believed that the isotropic thermal conductivity using the non-spherical alumina products disclosed herein can be superior to that achieved using spherical particles, due at least in part to greater inter-planar contact of the alumina particles within the polymer composition. And beneficially, it is believed that the non-spherical alumina products disclosed herein can be produced more cost efficiently and economically than comparable spherical particles.

Alumina Products

Consistent with one aspect of the present invention, the alumina product can have a fine particle size component and a coarse particle size component, and the alumina product can be characterized by a d50 particle size in a range from about 1 to about 20 µm, and a d90 particle size in a range from about 5 to about 50 µm. The "alumina product" of this invention also may be referred to as an "alumina composition" or an "alumina mixture"; these terms may be used interchangeably throughout this disclosure. Likewise, the "fine" particle size component also may be referred to as a "small" particle size component or a "first" particle size component; these terms may be used interchangeably throughout this disclosure. Similarly, the "coarse" particle size component also may be referred to as a "large" particle size component or a "second" particle size component; these terms may be used interchangeably throughout this disclosure. Consistent with another aspect of the present invention, the alumina product can have a fine particle size component and a coarse particle size component, and the fine particle size component can have a d50 particle size in a range from about 0.3 to about 6 µm, and the coarse particle size component can have a d50 particle size in a range from about 3 to about 35 µm. The amount of the fine particle size component in the alumina product is not particularly limited; however, the amount of the fine particle size component often can range from about 10 to about 90 wt. %, based on the total weight of the fine particle size component and the coarse particle size component.

In further aspects, alumina products consistent with the present invention also can have any of the characteristics or properties provided below, and in any combination.

In some aspects, the d50 particle size (median particle size) of the alumina product can be in a range from about 1 to about 20 µm, such as, for instance, from about 1 to about 10 µm, from about 2 to about 10 µm, from about 1 to about 7 µm, from about 1 to about 6 µm, from about 1.5 to about 7 µm, from about 1.5 to about 6 µm, from about 1 to about 5 µm, from about 1.5 to about 5 µm, or from about 1.5 to about 4.5 µm. Other appropriate ranges for the d50 particle size are readily apparent from this disclosure.

In some aspects, the d90 particle size (90% of the particles have a particle size less than or equal to the d90 particle size) of the alumina product can be in a range from about 5 to about 50 µm, such as, for instance, from about 7 to about 35 µm, from about 7 to about 32 µm, from about 5 to about 35 µm, from about 6 to about 40 µm, from about 6 to about 30 µm, from about 15 to about 40 µm, from about 16 to about 30 µm, from about 16 to about 28 µm, from about 6 to about 25 µm, or from about 7 to about 28 µm. Other appropriate ranges for the d90 particle size are readily apparent from this disclosure.

Generally, it can be beneficial—e.g., for downgauging or for thinner end-use applications—for the alumina product to have a d100 (maximum) particle size of less than or equal to about 100 µm. In one aspect, the d100 particle size can be less than or equal to about 85 µm, or less than or equal to about 75 µm, while in another aspect, the d100 particle size can be less than or equal to about 65 µm, less than or equal to about 60 µm, or less than or equal to about 50 µm. Other appropriate maximum d100 particle sizes for the alumina product are readily apparent from this disclosure.

Consistent with aspects of this invention, the alumina product can have an unexpectedly high tapped density that often falls within a range from about 1,600 to about 2,500, from about 1,700 to about 2,500, or from about 1,800 to about 2,500 kg/m$^3$. In further aspects, the tapped density can be in a range from about 1,800 to about 2,400, from about 1,900 to about 2,400, from about 1,800 to about 2,300, or from about 1,900 to about 2,300 kg/m$^3$. Other appropriate ranges for the tapped density are readily apparent from this disclosure.

The fine particle size component typically has a d50 particle size of less than or equal to about 6 µm. For example, the d50 of the fine particle size component often can fall within a range from about 0.3 to about 6 µm; alternatively, from about 0.5 to about 6 µm; alternatively, from about 0.5 to about 5 µm; alternatively, from about 0.5 to about 4 µm; alternatively, from about 0.8 to about 4.5 µm; alternatively, from about 0.8 to about 3.5 µm; alternatively, from about 1 to about 5 µm; alternatively, from about 1 to about 4.5 µm; alternatively, from about 1 to about 4 µm; alternatively, from about 1.5 to about 4.5 µm; or alternatively, from about 2 to about 4 µm. Other appropriate ranges for the d50 particle size of the fine particle size component are readily apparent from this disclosure.

The fine particle size component can be further characterized by the d90 particle size, which often falls within a range from about from about 1.5 to about 25 µm, and this can vary based on the milling procedures employed in producing the particles. In one aspect, the d90 of the fine particle size component can fall within a range from about 2 to about 20 µm, from about 2 to about 18 µm, or from about 1 to about 16 µm. In another aspect, the d90 of the fine particle size component can fall within a range from about 3 to about 20 µm, from about 3 to about 18 µm, or from about 3 to about 16 µm. Yet, in another aspect, the d90 of the fine particle size component can fall within a range from about 4 to about 20 µm, from about 4 to about 18 µm, or from about 4 to about 16 µm. Other appropriate ranges for the d90 particle size of the fine particle size component are readily apparent from this disclosure.

The surface area of the fine particle size component is not limited to any particular range; however, the BET surface area of the fine particle size component often falls within a range from about 0.5 to about 20 m$^2$/g. In some aspects, the BET surface area can be in a range from about 0.5 to about 8, or from about 1 to about 8 m$^2$/g, while in other aspects, the BET surface area can be in a range from about 0.8 to about 5, from about 0.8 to about 4, from about 1 to about 5 m$^2$/g, and the like. Other appropriate ranges for the BET surface area of the fine particle size component readily apparent from this disclosure.

Generally, the coarse particle size component has a d50 particle size of less than or equal to about 35 µm. For example, the d50 of the coarse particle size component often can fall within a range from about 3 to about 35 µm; alternatively, from about 5 to about 25 µm; alternatively, from about 7 to about 35 µm; alternatively, from about 8 to about 35 µm; alternatively, from about 8 to about 30 µm; alternatively, from about 8 to about 25 µm; alternatively, from about 8 to about 22 µm; alternatively, from about 10 to about 35 µm; alternatively, from about 10 to about 30 µm; alternatively, from about 10 to about 25 µm; alternatively, from about 10 to about 20 µm; alternatively, from about 12 to about 30 µm; or alternatively, from about 12 to about 22 µm. Other appropriate ranges for the d50 particle size of the coarse particle size component are readily apparent from this disclosure.

The coarse particle size component can be further characterized by the d90 particle size, which often falls within a range from about from about 15 to about 65 µm. In one aspect, the d90 of the coarse particle size component can fall within a range from about 20 to about 65 µm, from about 20 to about 60 µm, or from about 20 to about 55 µm. In another aspect, the d90 of the coarse particle size component can fall within a range from about 25 to about 65 µm, from about 25 to about 60 µm, or from about 25 to about 55 µm. Yet, in another aspect, the d90 of the coarse particle size component can fall within a range from about 25 to about 50 µm, from about 30 to about 55 µm, or from about 30 to about 50 µm. Other appropriate ranges for the d90 particle size of the coarse particle size component are readily apparent from this disclosure.

The surface area of the coarse particle size component is not limited to any particular range; however, the BET surface area of the coarse particle size component often falls within a range from about 0.1 to about 1.5 m$^2$/g. In some aspects, the BET surface area can be in a range from about 0.1 to about 1, or from about 0.2 to about 1 m$^2$/g, while in other aspects, the BET surface area can be in a range from about 0.25 to about 1.5, from about 0.25 to about 1, from about 0.25 to about 0.85 m$^2$/g, and the like. Other appropriate ranges for the BET surface area of the coarse particle size component readily apparent from this disclosure.

The relative amounts of the fine particle size component and the coarse particle size component in the alumina product are not particularly limited. However, the amount of the fine particle size component in the alumina product generally falls within a range from about 10 to about 90 wt. %, based on the total weight of the fine particle size component and the coarse particle size component. In further aspects, other suitable non-limiting ranges for the amount of the fine particle size component, based on the total weight of the fine particle size component and the coarse particle size component, include the following: from about 20 to about 80 wt. %, from about 30 to about 80 wt. %, from about 40 to about 80 wt. %, from about 50 to about 80 wt. %, from about 30 to about 70 wt. %, from about 40 to about 70 wt. %, from about 40 to about 60 wt. %, from about 45 to about 75 wt. %, or from about 45 to about 65 wt. %. Other appropriate ranges for the relative amounts of the fine particle size component and the coarse particle size component in the alumina product are readily apparent from this disclosure.

The alumina materials of this invention generally can be very high in α-alumina content. For instance, the alumina product (and/or the fine particle size component, and/or the coarse particle size component) can have an α-alumina content of from about 80 to 100 wt. %, from about 90 to 100 wt. %, or from about 95 to 100 wt. %. In some aspects, the α-alumina content of the alumina product (and/or the fine particle size component, and/or the coarse particle size component) can be from about 85 to about 99 wt. %, from about 90 to about 99 wt. %, or from about 92 to about 99 wt. %.

In these and other aspects, any of the alumina product, the fine particle size component, and/or the coarse particle size component can comprise (or consist essentially of, or consist of) calcined alumina particles. Moreover, any of the alumina product, the fine particle size component, and/or the coarse particle size component can comprise (or consist essentially of, or consist of) surface treated alumina particles. While not limited thereto, the amount of the surface treatment typically ranges from about 0.05 to about 5 wt. %, or from about 0.1 to about 1 wt. %, based on the weight of the alumina product. Any suitable surface treatment can be used, such as silane-based or fatty acid-based surface treatments, as well as nanometallic particles and carbon-based additives (e.g., nanotubes, graphenes), and these treatments can improve the compatibility of the alumina product with various polymers. Illustrative and non-limiting silane materials that are suitable for surface treating or coating the alumina product can include 3-aminopropyltriethoxysilane, 3-aminopropyltrimethoxysilane, N-(2-aminoethyl)-3-aminopropyltrimethoxysilane, N-(2-aminoethyl)-3-aminopropyltriethoxysilane, 3-(N-cyclohexylamino)propyltrimethoxysilane, diethylaminomethyltriethoxysilane, 3-mercaptopropyltriethoxysilane, 3-thiocyanatopropyltriethoxysilane, 3-glycidoxypropyltriethoxysilane, 3-isocyanatepropyltriethoxysilane, iso-butyltrimethoxysilane, methyltriethoxysilane, n-octyltriethoxysilane, n-decyltrimethoxysilane, n-dodecyltrimethoxysilane, n-hexadecyltrimethoxysilane, vinyltriethoxysilane, and the like, as well as combinations thereof.

Generally, the shape of the alumina particles consistent with aspects of this invention can be described as irregular and non-spherical. For instance, the alumina product, and/or the fine particle size component, and/or the coarse particle size component can be characterized by an average aspect ratio in a range from about 1.5:1 to about 30:1, from about 1.5:1 to about 20:1, or from about 1.5:1 to about 15:1. The aspect ratio is defined herein as the longest (measurable) particle dimension divided by the shortest dimension. As an example, if the particle is disc-shaped, the shortest dimension would be the thickness of the disc. In further aspects of the invention, the average aspect ratio can be in a range from about 2:1 to about 30:1, from about 2:1 to about 15:1, from about 2:1 to about 10:1, from about 2.5:1 to about 15:1, from about 3:1 to about 12:1, from about 3:1 to about 10:1, or from about 4:1 to about 8:1. Other appropriate average aspect ratios are readily apparent from this disclosure. Additional information on aspect ratio and its determination is presented in the Examples that follow, which reference FIGS. 14-20.

Additionally or alternatively, the irregular and non-spherical attributes of the alumina product, and/or the fine component, and/or the coarse component can be quantified by the average sphericity and/or average roundness of the particles. For instance, the average sphericity and/or average roundness can be less than or equal to about 0.7, less than or equal to about 0.6, less than or equal to about 0.5, in a range from about 0.4 to about 0.6, in a range from about 0.3 to about 0.6, in a range from about 0.3 to about 0.5, or in a range from about 0.5 to about 0.7. The general particle shape can be described as angular or subangular, as described in U.S. Pat. No. 8,945,517 (incorporated herein by reference in its entirety). Additional information on particle shape is presented in the Examples that follow, which reference FIGS. 1-6 and FIGS. 7A-7B.

While not required, the alumina product also can contain various amounts of a synergist material or compound, in order to provide improved performance in certain areas. As an example, the alumina product can further comprise a synergist compound, such as boron nitride, silicon nitride, aluminium nitride, magnesium oxide, graphite, or any flame retardant (e.g., aluminium hydroxide, magnesium hydroxide, or a phosphorus/nitrogen-containing flame retardant), and the like, or combinations thereof. Typical loadings of the synergist compound can range from about 0.5 to about 30 wt. %, from about 1 to about 25 wt. %, from about 1 to about 20 wt. %, or from about 2 to about 15 wt. %, based on the weight of the alumina product.

Compositions Containing the Alumina Products

This invention is also directed to, and encompasses, any compositions, formulations, and articles of manufacture that contain any of the alumina products disclosed herein (and their respective characteristics or features, such as the particle size distribution of the alumina product, the fine particle size component, and the coarse particle size component). In a particular aspect of this invention, a polymer composition is disclosed, and in this aspect, the polymer composition can comprise any suitable polymer (one or more than one) and any of the alumina products disclosed herein.

In one aspect, the polymer in the polymer composition can comprise a thermoplastic polymer, while in another aspect, the polymer can comprise a thermoset polymer. In another aspect, the polymer can comprise, either singly or in any combination, an epoxy, an acrylic, an ester, a urethane, a silicone, and/or a phenolic. In yet another aspect, the polymer can comprise, either singly or in any combination, a polyethylene (e.g., an ethylene homopolymer or ethylene-based copolymer), a polypropylene, a polybutylene terephthalate, an acrylonitrile butadiene styrene (ABS), a polyamide, a polyimide, a polystyrene, a polycarbonate, an ethylene-vinyl acetate (EVA) copolymer, and/or a polyolefin-styrene (e.g., ethylene-styrene). In still another aspect, the polymer can comprise a rubber and/or an elastomer based upon a nitrile, a butadiene, isobutylene, isoprene, a styrene butadiene, and the like, as well as any combination thereof.

While not being limited thereto, the amount of the alumina product, based on the polymer composition (total weight), often can range from about 10 to about 93 wt. %, from about 50 to about 93 wt. %, from about 80 to about 93 wt. %, from about 10 to about 92 wt. %, from about 50 to about 92 wt. %, from about 80 to about 92 wt. %, or from about 82 to about 90 wt. %. Likewise, the amount of the alumina product, based on the polymer composition (total volume), often can range from about 15 to about 75 vol. %, from about 40 to about 75 vol. %, from about 47 to about 74 vol. %, from about 48 to about 73 vol. %, or from about 50 to about 70 vol. %. Other appropriate loadings of the alumina product in the polymer composition are readily apparent from this disclosure.

Beneficially, the alumina product can provide improved thermal conductivity to the polymer composition. Typical isotropic thermal conductivities of the polymer composition generally can range from about 0.5 to about 10 W/m·K (watts per meter kelvin), from about 0.5 to about 8 W/m·K, from about 1 to about 6 W/m·K, from about 1 to about 5 W/m·K, or from about 1 to about 3 W/m·K, and the like.

In some aspects of this invention, the polymer composition of this invention can have an isotropic thermal conductivity that is greater than that of a polymer composition containing a spherical alumina product having the same particle size characteristics (of the non-spherical alumina product disclosed herein). Additionally or alternatively, the polymer composition can have an isotropic thermal conductivity that is greater than that of a polymer composition containing an irregular (non-spherical) alumina product having different particle size characteristics (from that of the alumina product disclosed herein).

Due it at least in part to the advantageous packing qualities of the alumina products disclosed herein, the polymer composition can have a relatively low viscosity, and additionally or alternatively, a viscosity that is substantially independent of shear rate in the low shear rate region. In one aspect, the polymer composition can have a viscosity that is less than that of a polymer composition containing an irregular (non-spherical) alumina product having different particle size characteristics (from that of the alumina product disclosed herein). In another aspect, the alumina product can be a surface treated alumina product, and the polymer composition can have a viscosity that is substantially independent of shear rate (the viscosity is substantially the same or constant (+/−10%) over a given shear rate range). For instance, the shear rate range can be from 5 to 20 sec$^{-1}$, from 10 to 20 sec$^{-1}$, or from 5 to 15 sec$^{-1}$. The viscosity testing can be performed using 72 wt. % alumina product in a polyether polyol at 23° C.

Under similar conditions (72 wt. % alumina product in a polyether polyol at 23° C.) for a surface treated alumina product, the polymer composition can have a relatively low viscosity ranging from about 5,000 to about 15,000 mPa-sec, from about 5,000 to about 10,000 mPa-sec, from about 6,000 to about 12,000 mPa-sec, or from about 6,000 to about 9,000 mPa-sec. Such can be determined at a shear rate of 5 sec$^{-1}$, or 10 sec$^{-1}$, or 15 sec$^{-1}$.

Under similar conditions (72 wt. % alumina product in a polyether polyol at 23° C.) for an untreated alumina product, the polymer composition can have a relatively low viscosity ranging from about 9,000 to about 30,000 mPa-sec, from about 9,000 to about 25,000 mPa-sec, from about 10,000 to about 22,000 mPa-sec, or from about 10,500 to about 18,000 mPa-sec. Such can be determined at a shear rate of 5 sec$^{-1}$, or 10 sec$^{-1}$, or 15 sec$^{-1}$.

Even with high alumina loadings (e.g., 70 wt. %, 80 wt. %), the polymer compositions in accordance with this invention can maintain very good polymer attributes, such as elongation at break. In some aspects, the polymer composition can have an elongation at break that is greater than that of a polymer composition containing a spherical alumina product having the same particle size characteristics (of the non-spherical alumina product disclosed herein). Additionally or alternatively, the polymer composition can have an elongation at break that is greater than that of a polymer composition containing an irregular (non-spherical) alumina product having different particle size characteristics (from that of the alumina product disclosed herein).

In another aspect, the polymer composition can have an elongation at break in a range from about 500 to about 1000%, or from about 600 to about 900%. The elongation testing can be performed using 80 wt. % alumina product in a 0.885 density ethylene/1-octene copolymer.

Due to the presence of the alumina product, the polymer composition can have improved flame retardancy. In an aspect, the polymer composition can have a time to ignition that is greater than that of a polymer composition containing a spherical alumina product having the same particle size characteristics (of the non-spherical alumina product disclosed herein). Additionally or alternatively, the polymer composition can have a time to ignition that is greater than that of a polymer composition containing an irregular (non-spherical) alumina product having different particle size characteristics (from that of the alumina product disclosed herein). The heat release rate and time to ignition testing can be performed using 60 wt. % alumina product in a EVA/PE blend.

Articles of manufacture can be formed from and/or can comprise any of the polymer compositions described herein. In an aspect, the article of manufacture can comprise a gel, paste, or coating. In another aspect, the article of manufacture can comprise a (polymeric) sheet or film. In yet another aspect, the article of manufacture can comprise an electronic component (e.g., a semiconductor device, a circuit board, and the like). In still another aspect, the article of manufacture can comprise functional sheets, IC packages, heat sinks, electrical power appliances, tapes, pads, thermal gap fillers, encapsulation compounds, adhesives, greases, sealing materials, coatings, $SF_6$ gas circuit breakers, solar panels, and the like. Other appropriate articles of manufacture and end-use applications are readily apparent from this disclosure.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

The d50 particles size, or median particle size, refers to the particle size for which 50% of the sample has a smaller size and 50% of the sample has a larger size. All particle size measurements (inclusive of d10, d50, d90, and d100) were determined by laser diffraction using a Cilas 1064 L laser spectrometer from Quantachrome according to ISO 13320.

The BET surface areas disclosed herein were determined in accordance with DIN-66132 using Micromeritics Gemini V and Gemini VII instruments.

Tapped density used a jolting volumeter STAV 2003 according to ISO 787 part 11, ASTM B 527-93. A standard measuring cylinder of 250 mL was filled with 200 g of the sample, and then was jolted until the sample volume was constant (typically 1250 shakes were sufficient). The final volume was recorded and used to calculate the tapped density by dividing it into the weight of sample used.

The relative amount of α-alumina was measured via X-ray diffraction on a D2 Phaser Bruker AXS, using standard measurement parameters according to the Bruker manual. The α-alumina content was determined with the software "Diffrac EVA" version 2.0. The method and the instrumental conditions of a phase specific x-ray diffraction experiment were as follows: Radiation: $Cu_{k\alpha 1}$; Generator voltage: 30 kV; Generator current: 10 mA; and the reflection angle 2θ was measured for the reflexes (104) and (113) corresponding with the 2θ range 34.6° to 36.0° and 42.8° and 44.2°. The step size was 0.01°/step and the measuring was 1 s/step. The sum of the two resulting intensities of the specific sample was compared in relation to the standard, a pure alpha-alumina with an α-content of 100%. Therefore, the sum of the intensities was directly proportional to the α-alumina content of the sample. The percent α-alumina content of the sample was calculated by multiplying 1 P times 100, and dividing by 1 S, where 1 P was the integral intensity of the sample (sum of peak 104 and 113), and 1 S was the integral intensity of the standard (sum of peak 104 and 113).

Suitable methods of incorporation and addition of the alumina and polymer components of the polymer composition were used to ensure uniform mixing and distribution of the alumina product. Typical apparatus can include a Buss Ko-kneader, internal mixers, Farrel continuous mixers, or twin screw extruders, as well as single screw extruders or two roll mills in some cases. The compounded product can then be molded or extruded in a subsequent processing step.

Viscosities at 23° C. of polymer compositions were determined using a RheoStress® 6000 rotational viscometer, rotor Z25 (DIN 53019). The tensile strength and elongation at break were measured in accordance with DIN 53504 and EN ISO 527. Cone calorimetry measurements were made according to ASTM E 1354 at 35 $kW/m^2$ on 3 mm thick compression molded plates. The time to ignition value is the time when the sample ignites due to heat exposure in the cone calorimeter.

Through-plane (isotropic) thermal conductivity measurements were conducted using a steady state method via THASYS (THA01-1419) ASTM 1114-06 at 23° C. Generally, "through-plane" thermal conductivity values are lower than thermal conductivity values (e.g., often by 0.1 to 2 W/m·K) determined using other test procedures and equipment.

Example 1

The alumina product of Example 1 was produced from a fine particle size component and a coarse particle size component. The fine particle size component had 0.3 wt. % of a silane surface treatment and had a d50 particle size of 1.8 µm, a d90 particle size of 4.4 µm, and a BET surface area of 2.2 $m^2/g$. The fine particle size component was produced using a Bayer process to produce the feedstock, followed by calcining at 1350° C., and then ball milling to the final particle size. FIG. 1 is a scanning electron micrograph of the fine particle size component; FIG. 1 demonstrates the irregularly shaped and non-spherical particles in the fine particle size component.

Figure 2:
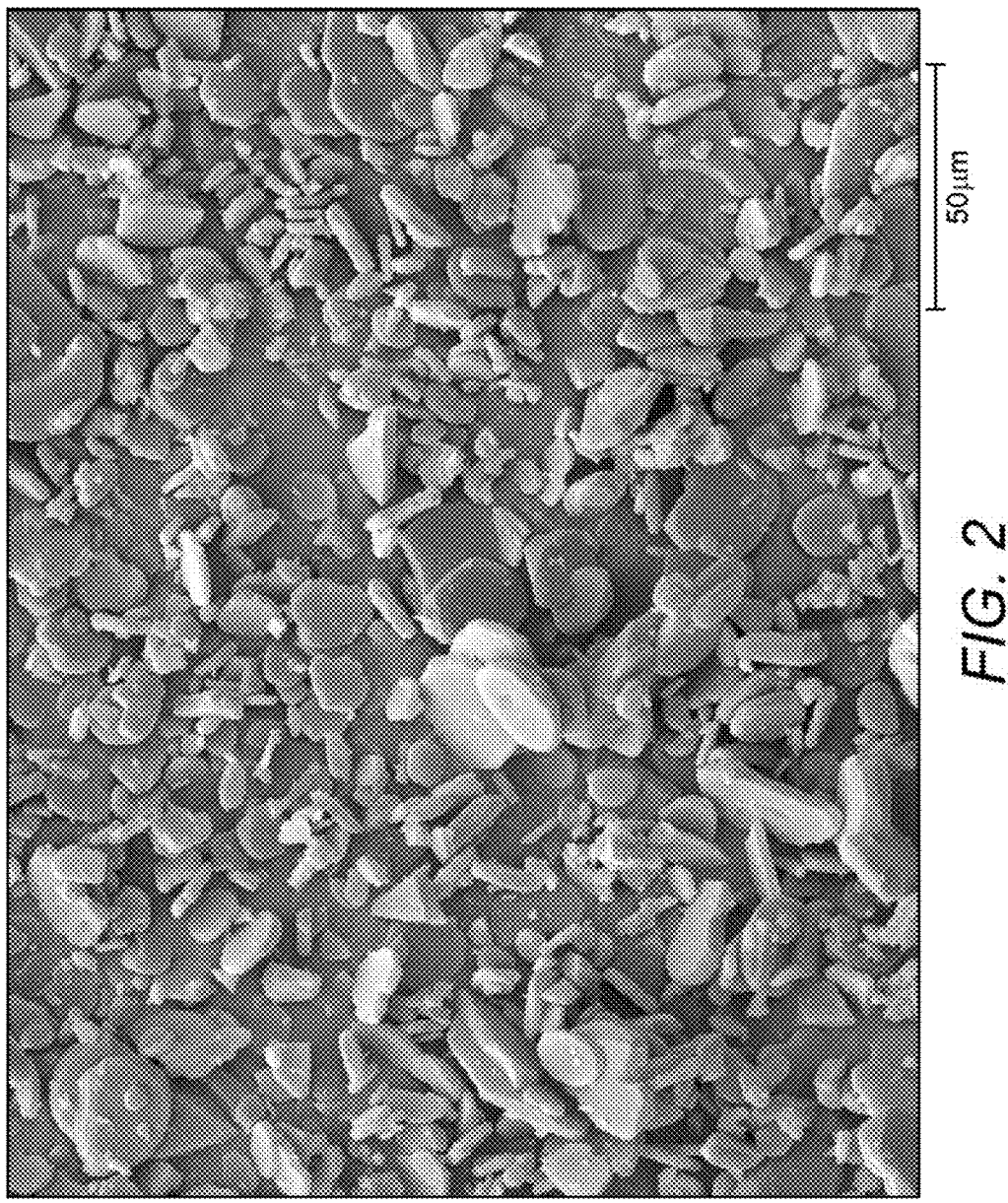
FIGS. 2-4 present scanning electron micrographs of the coarse particle size component used in the alumina product of Example 1.
Figure 3:
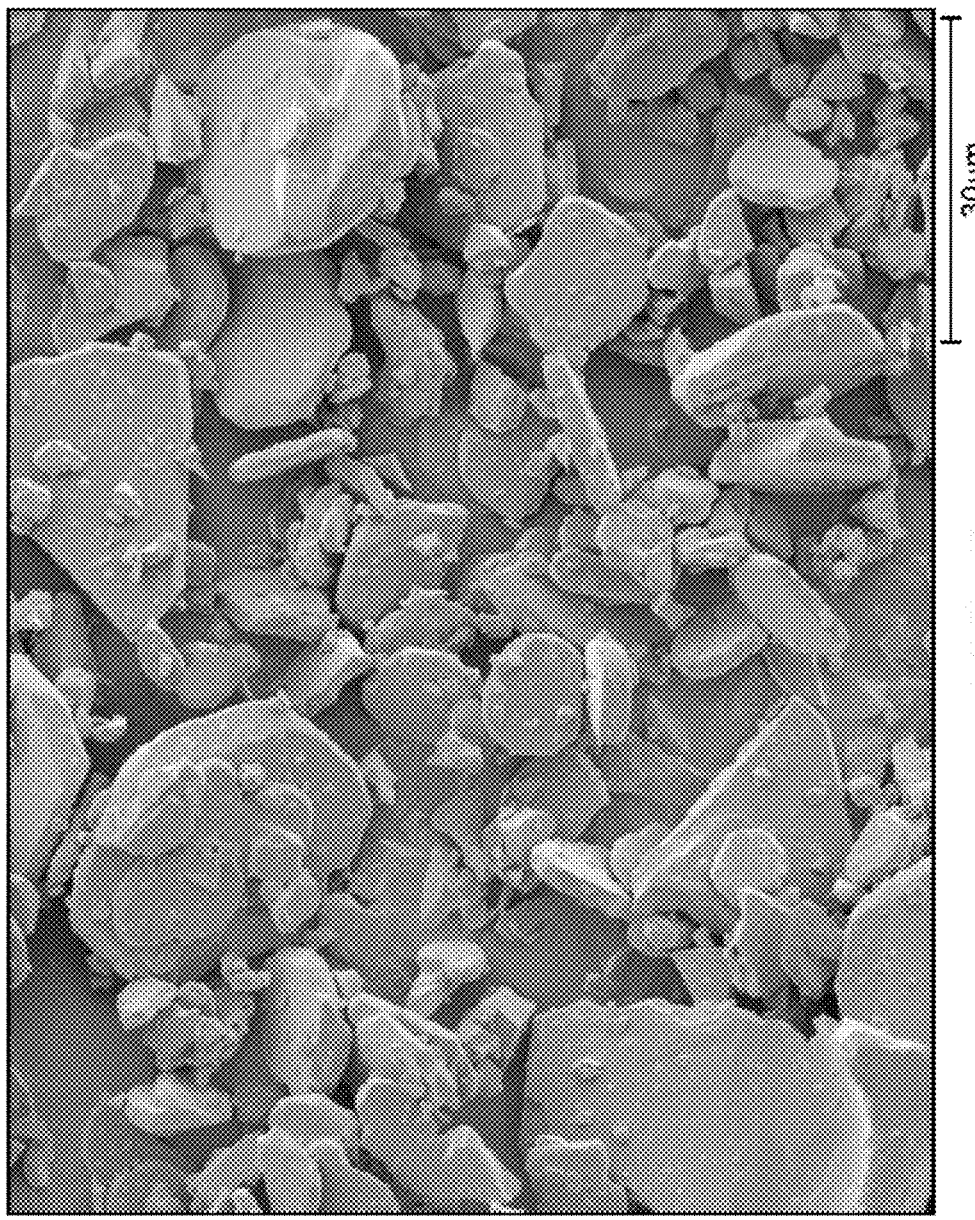
Figure 4:
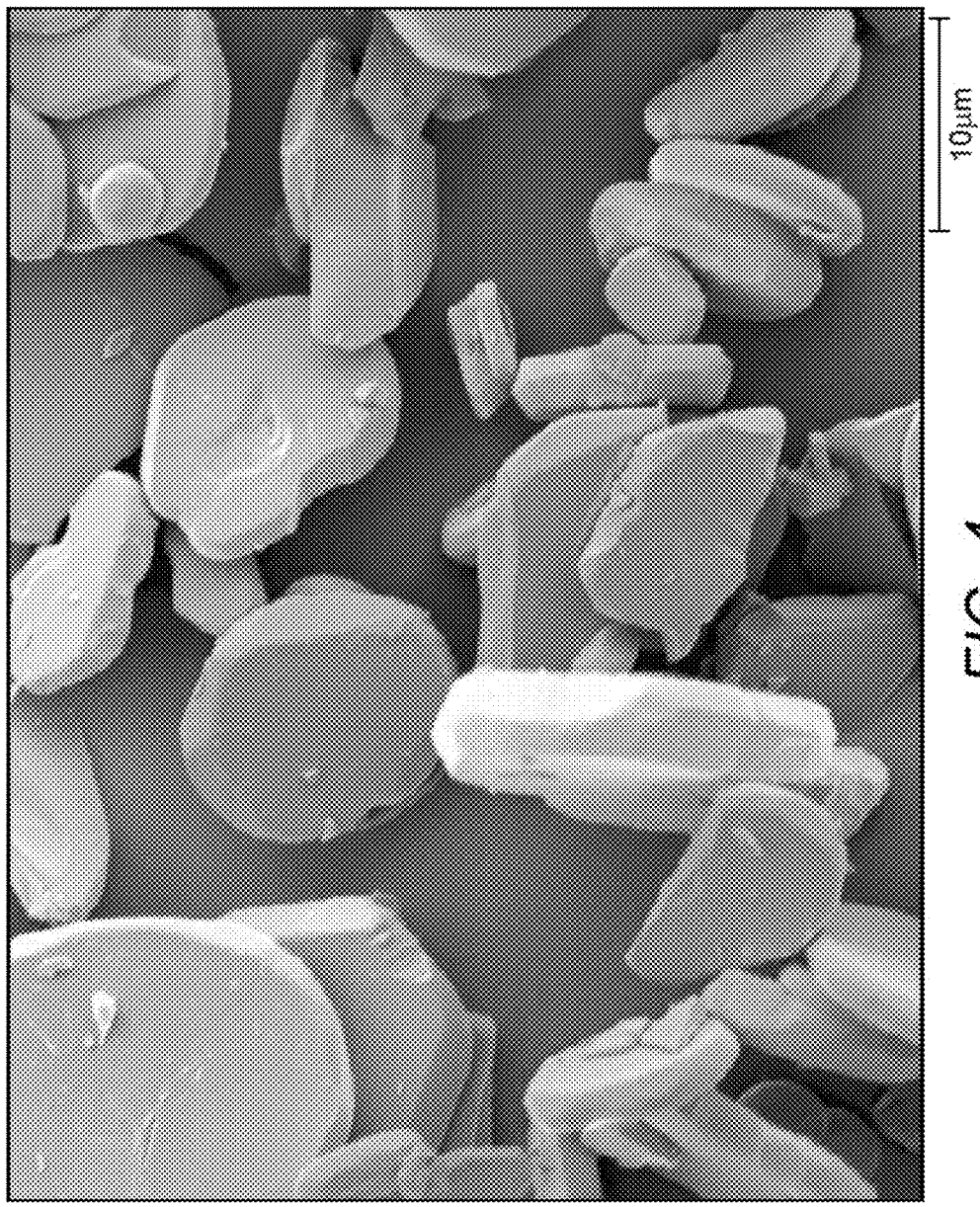

The coarse particle size component had 0.3 wt. % of a silane surface treatment and had a d50 particle size of 16 µm, a d90 particle size of 33 µm, and a BET surface area of 0.4 $m^2/g$. The coarse particle size component was produced in a similar manner to the fine particle size component. FIGS. 2-4 are scanning electron micrographs of the coarse particle size component; FIGS. 2-4 demonstrate the irregularly shaped and non-spherical particles (e.g., plate-like, disc-like) in the coarse particle size component. As discussed further at the end of the example section, and in reference to FIGS. 14-16, the average aspect ratio of the coarse particle size component was approximately 5:1.

FIG. 7A is a pictorial representation of the sphericity and the roundness of particles; the fine particle size component and coarse particle size component generally had sphericity values of about 0.3 to about 0.7 and roundness values of about 0.3 to about 0.7. FIG. 7B is a pictorial representation of various categories of particle roundness; the fine particle size component and coarse particle size component generally contained angular and subangular particles.

Figure 8:
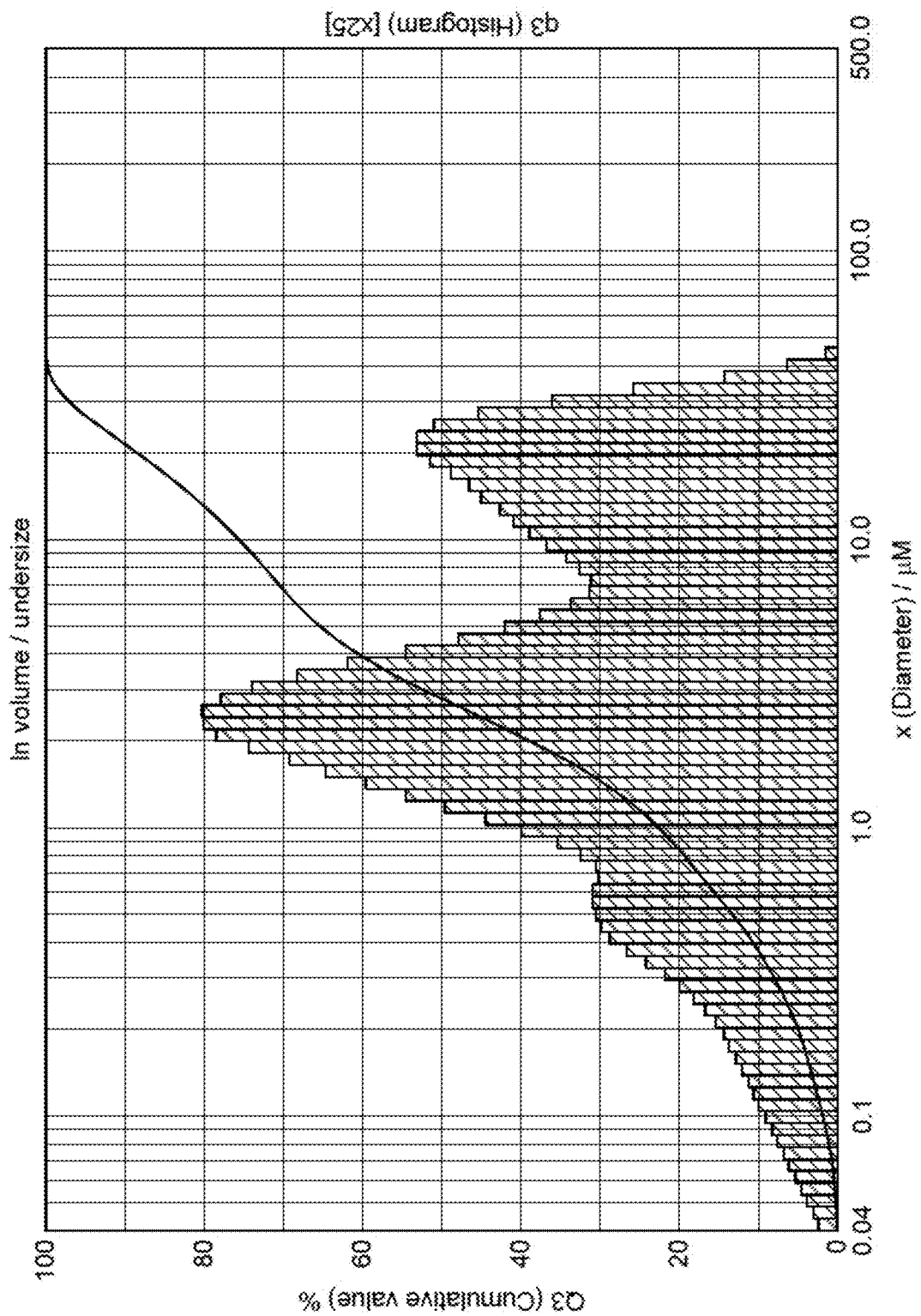
FIG. 8 presents a plot of the particle size distribution of the alumina product of Example 1.

The fine particle size component and the coarse particle size component were mixed at equal amounts (50 wt. % fine and 50 wt. % coarse) to form the alumina product of Example 1. FIG. 8 depicts the particle size distribution of the alumina product of Example 1, and in sum, the alumina product had a d10 of 0.4 µm, a d50 of 2.8 µm, a d90 of 21.5 µm, and a d100 of 45 µm. The alumina product also had a tapped density of 2,160 $kg/m^3$, and an α-alumina content of greater than 95 wt. %.

Example 2

The alumina product of Example 2 was produced by mixing 65 wt. % of a fine particle size component and 35 wt. % of the coarse particle size component of Example 1. The fine particle size component had 0.3 wt. % of a silane surface treatment and had a d50 particle size of 4 µm, a d90 particle size of 11 µm, and a BET surface area of 1.2 $m^2/g$. The fine particle size component of Example 2 was produced in a similar manner to the fine particle size component of Example 1, but had more particles with a plate-like or disc-like shape.

Figure 5:
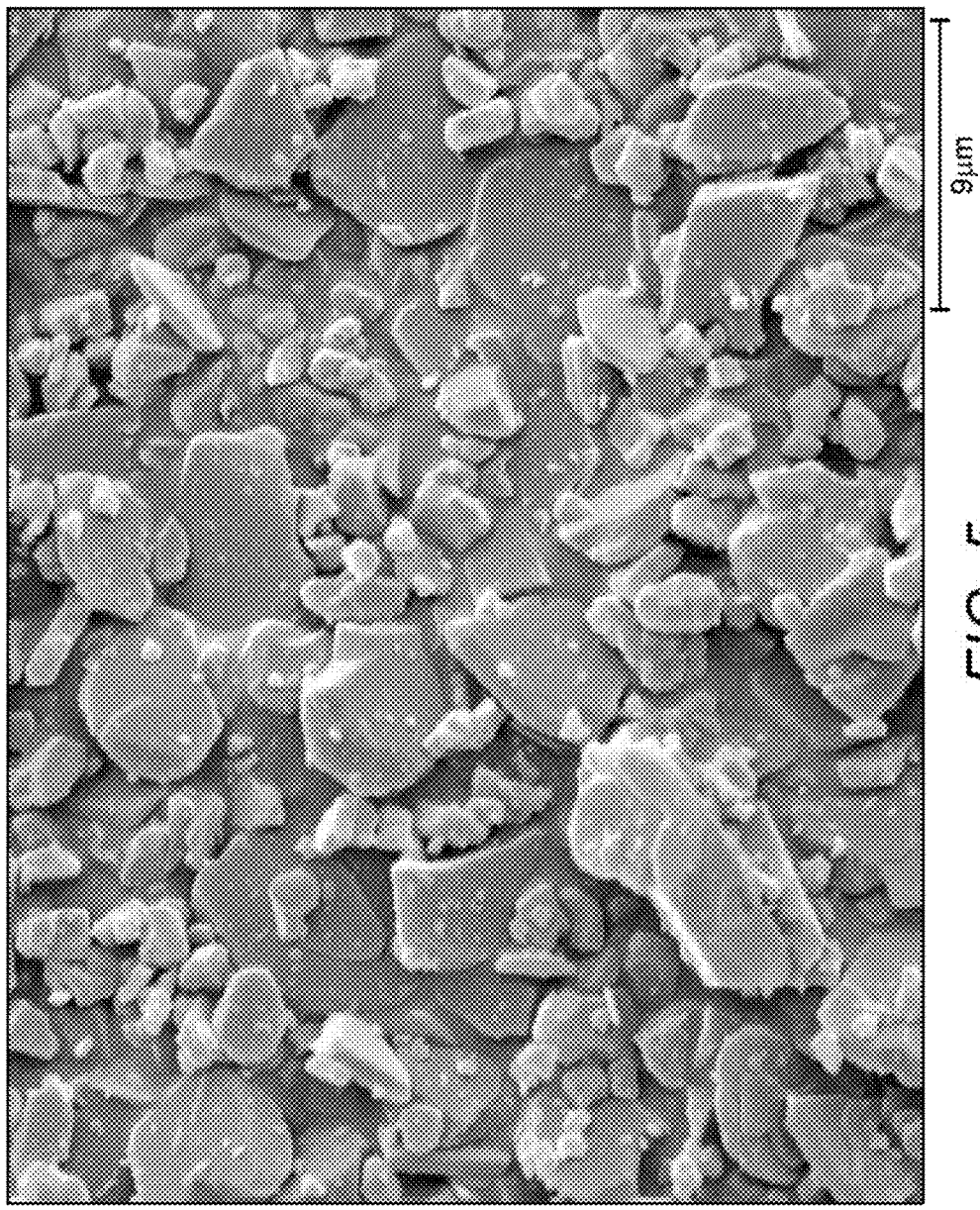
FIGS. 5-6 present scanning electron micrographs of the fine particle size component used in the alumina product of Example 2.
Figure 6:
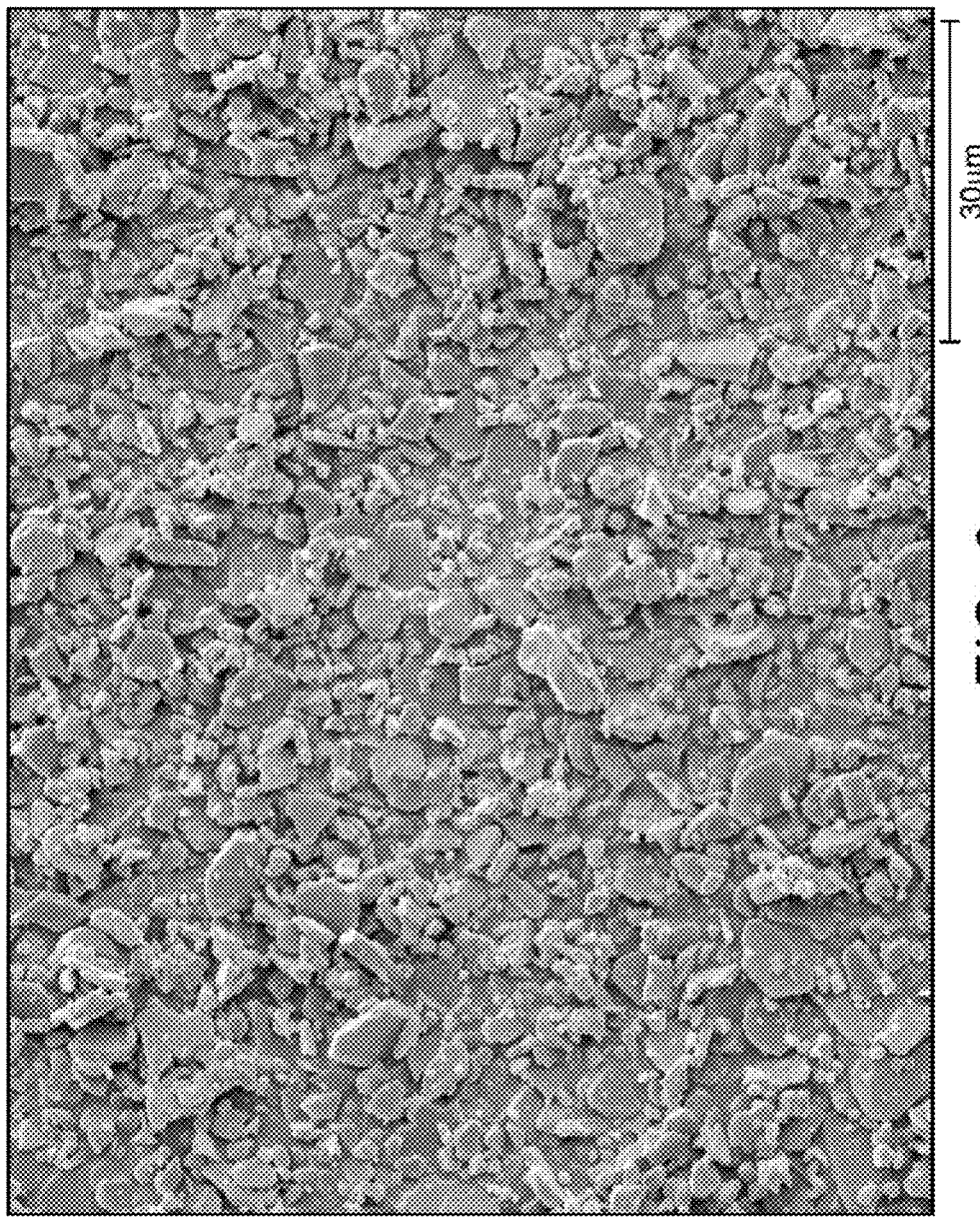

FIGS. 5-6 are scanning electron micrographs of the fine particle size component of Example 2; FIGS. 5-6 demonstrate the irregular, plate-shaped and non-spherical particles in the fine particle size component. As discussed further at the end of the example section, and in reference to FIGS. 17-20, the average aspect ratio of the fine particle size component was approximately 7:1.

Figure 9:
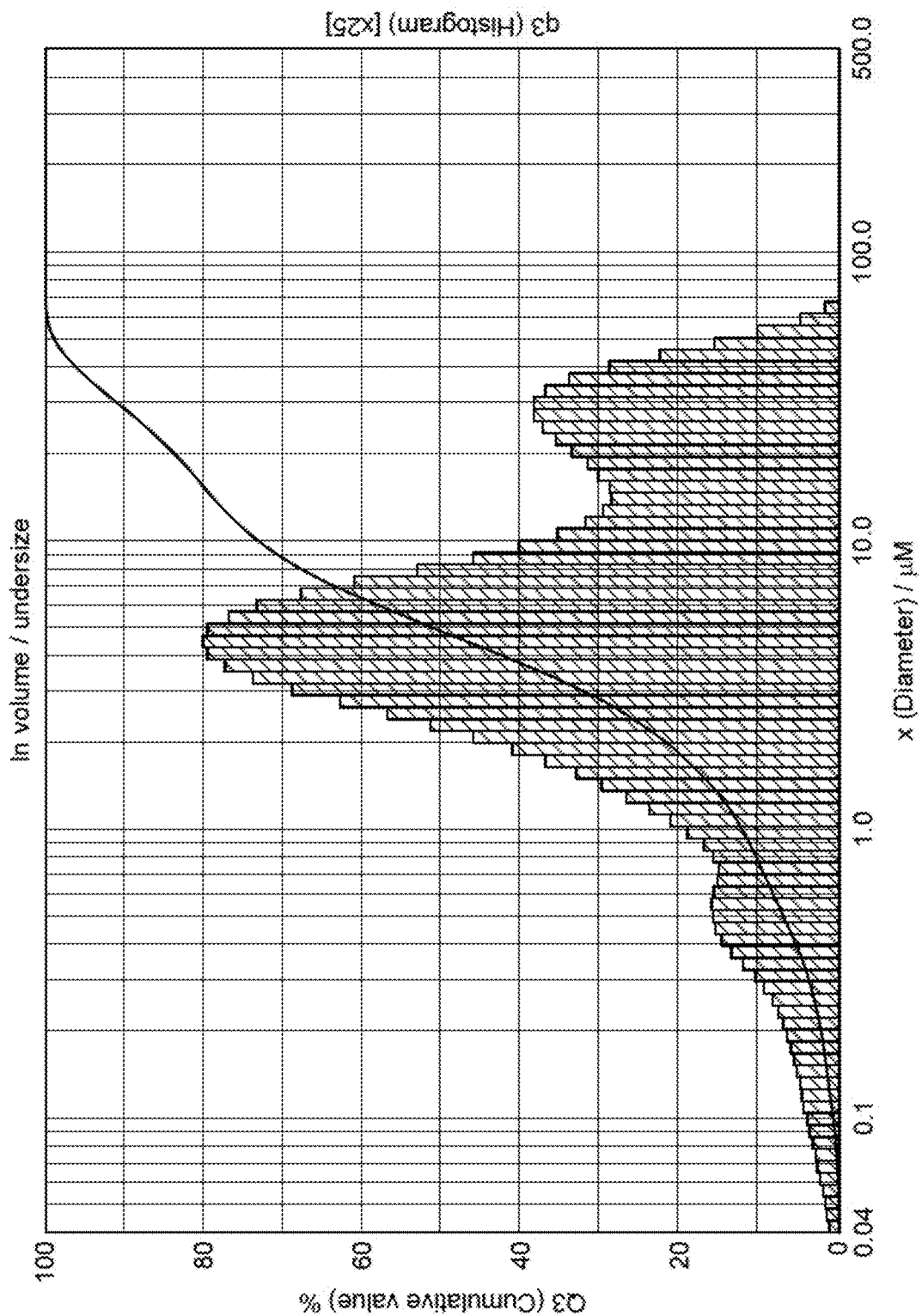
FIG. 9 presents a plot of the particle size distribution of the alumina product of Example 2.

FIG. 9 depicts the particle size distribution of the alumina product of Example 2, and in sum, the alumina product had a d10 of 0.75 µm, a d50 of 4.8 µm, a d90 of 28 µm, and a d100 of 75 µm. The alumina product also had a tapped density of 2100 $kg/m^3$, and an α-alumina content of greater than 95 wt. %.

Example 3

Figure 10:
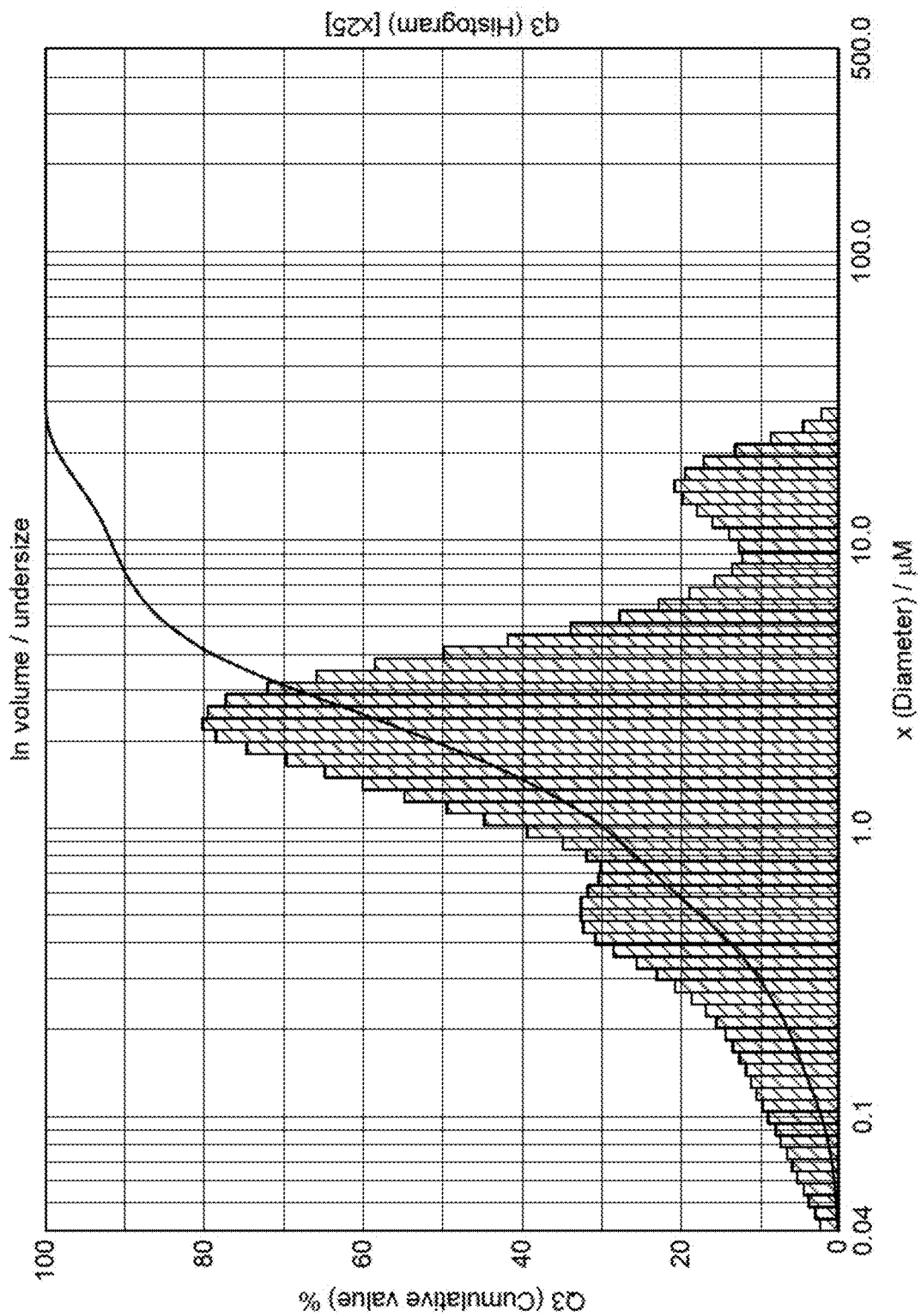
FIG. 10 presents a plot of the particle size distribution of the alumina product of Example 3.

The alumina product of Example 3 was produced by mixing 75 wt. % of the fine particle size component of Example 1 and 25 wt. % of the coarse particle size component of Example 1. FIG. 10 depicts the particle size distribution of the alumina product of Example 3, and in sum, the alumina product had a d10 of 0.3 µm, a d50 of 1.95 µm, a d90 of 7.7 µm, and a d100 of 32 µm. The alumina product also had a tapped density of 1850 kg/m³, and an α-alumina content of greater than 95 wt. %.

Examples 4-5

Figure 11:
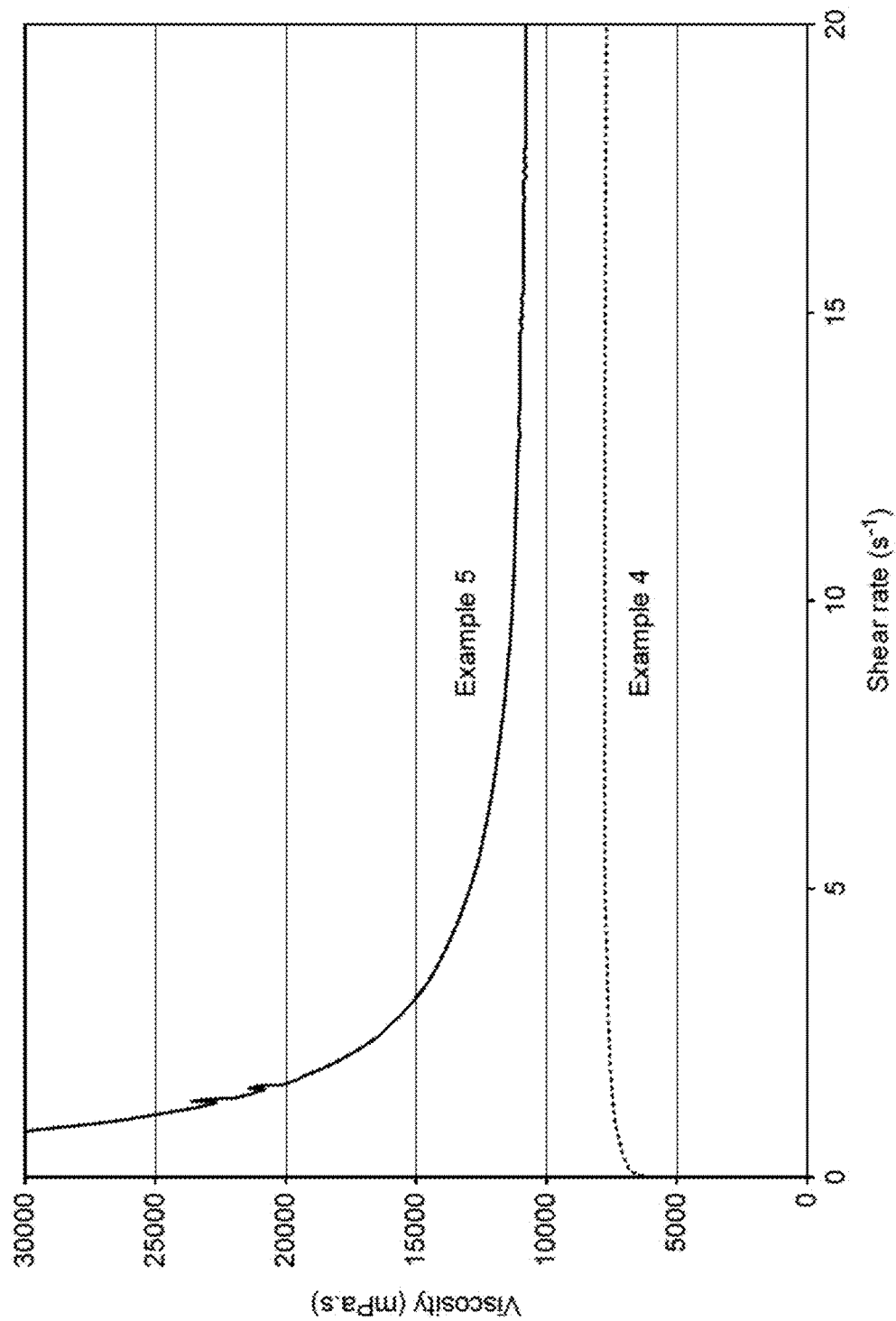
FIG. 11 presents plots of the viscosity versus shear rate for Example 4 and Example 5.

Example 4 used the alumina product of Example 1, while Example 5 used the same alumina product of Example 1, but without the silane surface treatment. In each example, the alumina product was blended with Caradol® polyether polyol at 72 wt. % alumina loading. FIG. 11 presents a plot of the viscosity versus shear rate profiles for the polymer compositions of Example 4 and Example 5 at 23° C. Unexpectedly, the viscosity was substantially constant and independent of shear rate within the shear rate range from 5 to 20 sec$^{-1}$ (or from 5 to 15 sec$^{-1}$, or from 10 to 20 sec$^{-1}$).

Within this shear rate range, the polymer composition of Example 4 had a surprisingly low viscosity of approximately 7500 mPa-sec, and the polymer composition of Example 5 also had a surprisingly low viscosity of approximately 11,000-12,000 mPa-sec, particularly given the alumina loading of 72 wt. %. In comparison, under the same test conditions, the untreated fine particle size components of Examples 1-2 had higher viscosities of approximately 18,000-20,000 mPa-sec, and the surface treated fine particle size components of Examples 1-2 had higher viscosities of approximately 12,000 mPa-sec, in the 10 to 20 sec$^{-1}$ shear rate range.

Example 6

Example 6 used the alumina product of Example 1. For Example 6, the alumina product was compounded with Engage® 8003 polyolefin elastomer (0.885 density ethylene/1-octene copolymer, melt index of 1 g/10 min at 190° C. and 2.16 kg (ASTM D1238)) at 80 wt. % alumina loading. The melt index of the polymer composition of Example 6—containing 80 wt. % of the alumina product of Example 1—was 7.5 g/10 min. The elongation at break of the filled polymer was 870%. The high melt index (low viscosity) and high elongational properties were unexpected, given that the comparable properties using the untreated fine particle size components of Examples 1-2 were approximately 3.2 g/10 min (melt index) and 306% (elongation at break), and using the surface treated fine particle size components of Examples 1-2 were approximately 5.3 g/10 min (melt index) and 675% (elongation at break), Examples 7-8

Figure 12:
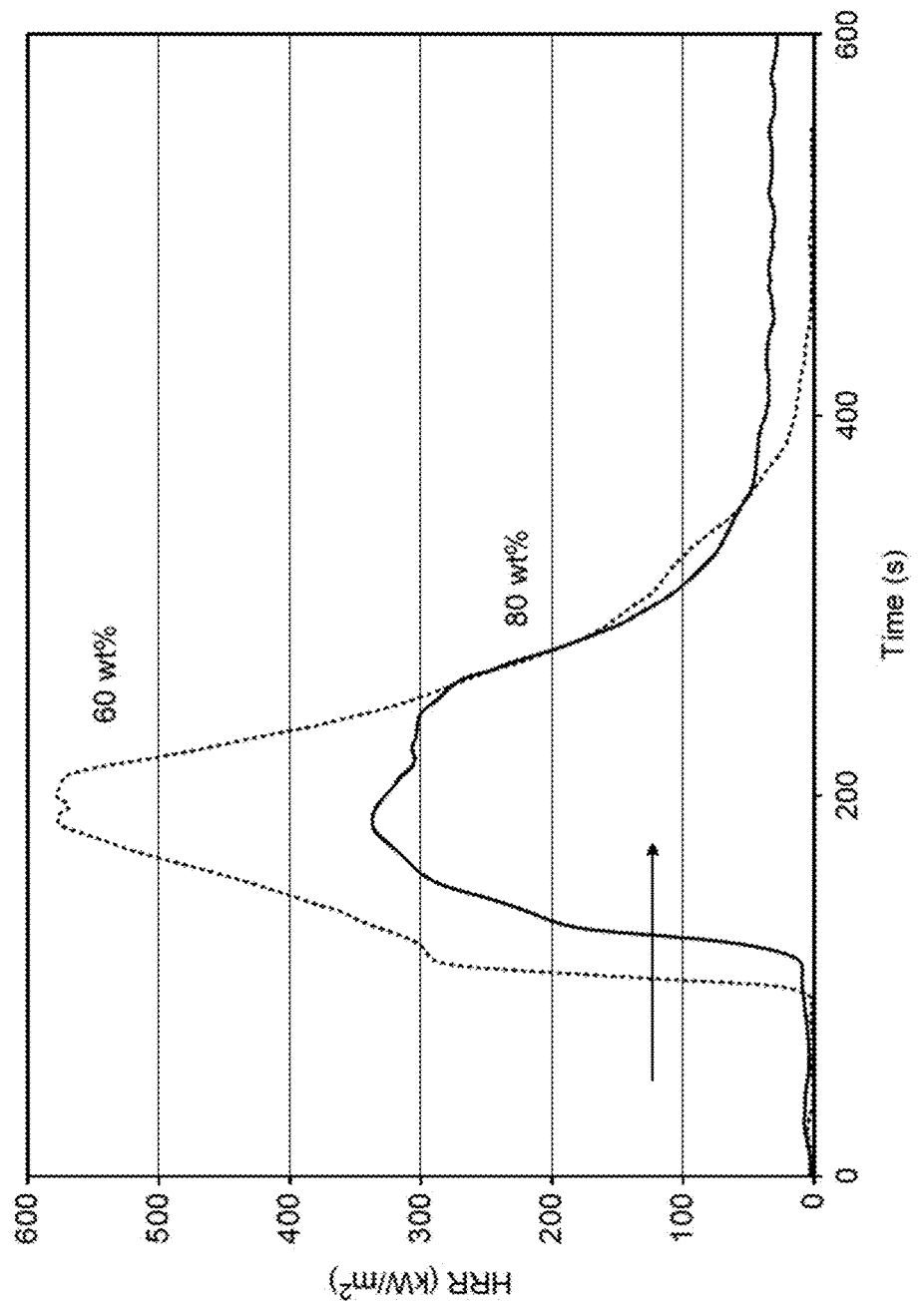
FIG. 12 presents plots of the heat release rate (HRR) curves for Example 7 (60 wt. % alumina product) and Example 8 (80 wt. % alumina product).

Examples 7-8 used the alumina product of Example 1. For Example 7, the alumina product was compounded with a blend of 75 wt. % EVA and 25 wt. % polyethylene at 60 wt. % alumina loading. Example 8 used 80 wt. % of the alumina product. FIG. 12 illustrates the heat release rate (HRR) curves for Example 7 (60 wt. %) and Example 8 (80 wt. %). Unexpectedly, the increased amount of alumina resulted in better flame retardancy, as indicated by the increased time to ignition (shifting of curve to the right in FIG. 12).

Examples 9-14

Example 9-14 used the ethylene/1-octene copolymer of Example 6, and Examples 10-14 also used the alumina product of Example 1. Example 9 did not contain any alumina, Example 10 contained 18 vol. % alumina, Example 11 contained 40 vol. % alumina, Example 12 contained 47 vol. % alumina (80 wt. %), Example 13 contained 56 vol. % alumina, and Example 14 contained 67 vol. % alumina.

Figure 13:
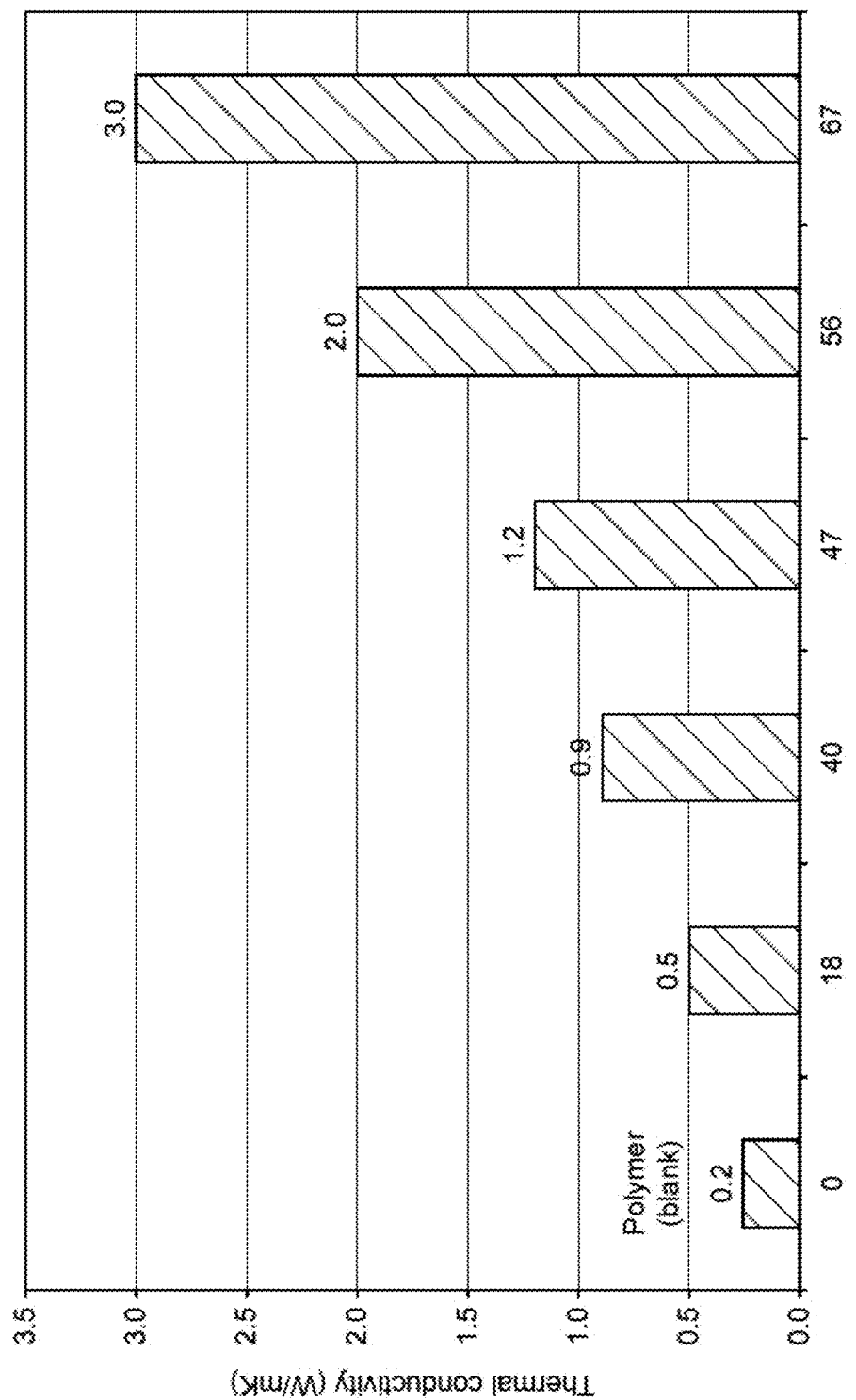
FIG. 13 presents a bar chart of the through-plane (isotropic) thermal conductivity values for Examples 9-14.

FIG. 13 is a bar chart that demonstrates an increase in through-plane (isotropic) thermal conductivity as the alumina loading increases. Isotropic thermal conductivities of greater than 1 and up to 3 W/m·K were achieved with polymer compositions containing from 47 vol. % to 67 vol. % alumina, as shown in FIG. 13.

Examples 15-16

Examples 15-16 used the alumina product of Example 1, but with 0.6 wt. % of a silane surface treatment. For Example 15, the alumina product was compounded via twin screw extrusion with BASF Ultramid® B29 HM 01 unreinforced polyamide PA 6 (Nylon 6) at 50 wt. % alumina loading. Example 16 used 70 wt. % of the alumina product. As shown in the table below, the resulting polymer compositions of Examples 15-16 had excellent mechanical properties (high tensile strength at break, high elastic modulus, and relatively high elongation at break) and excellent isotropic thermal conductivity. These compositions also had good rheological properties for beneficial processability in injection molding and other applications.

| Example | Alumina Loading (wt./vol. %) | Elongation @ Break (%) | Elastic Modulus (MPa) | Tensile Strength (MPa) | Thermal Conductivity (W/m · K) |
| --- | --- | --- | --- | --- | --- |
| 15 | 50/22 | 5.2 | 6000 | 85 | 0.7 |
| 16 | 70/40 | 4.0 | 9500 | 95 | 1.2 |

DETERMINATION OF AVERAGE ASPECT RATIO

Figure 14:
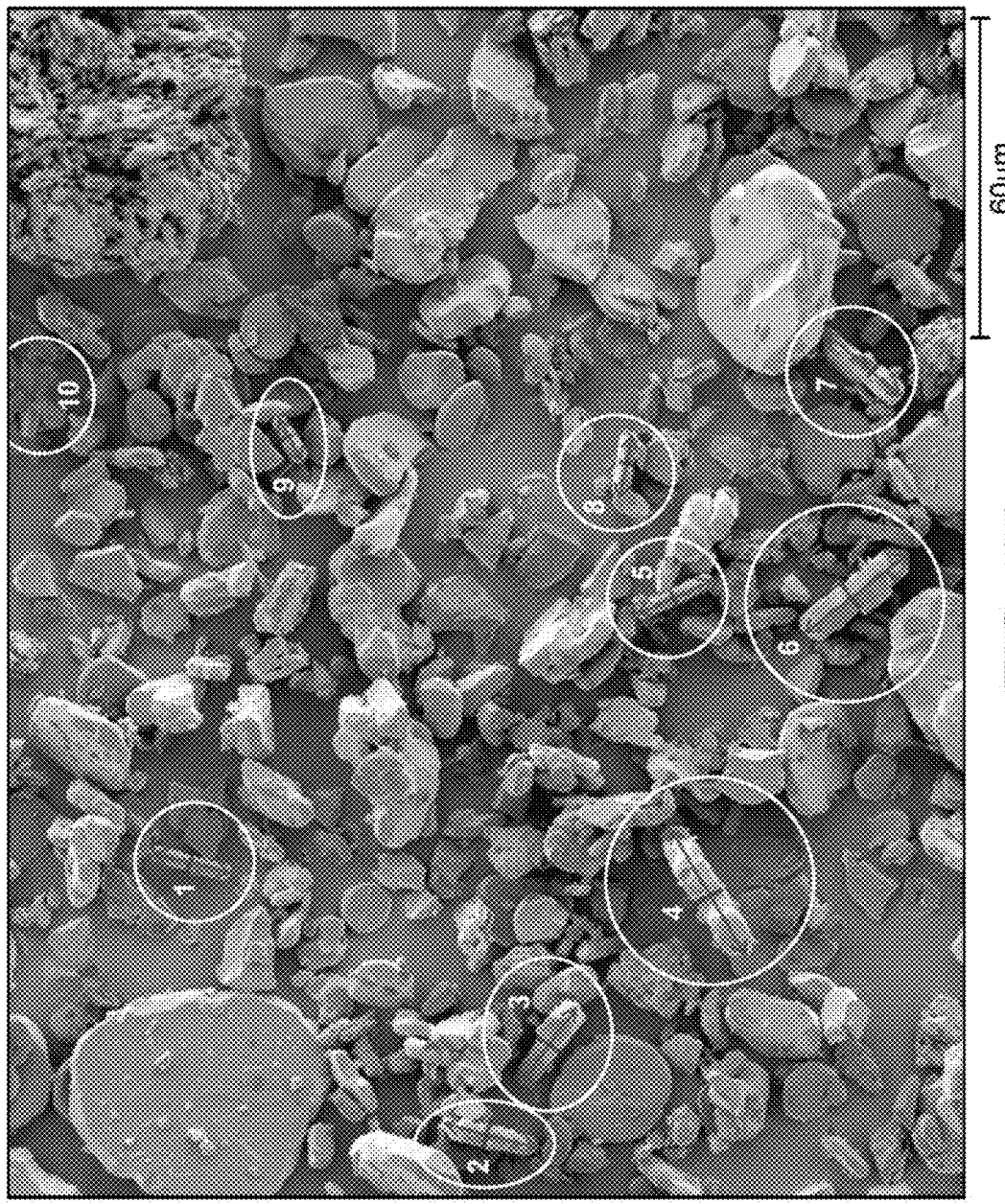
FIGS. 14-16 present scanning electron micrographs used for the determination of the average aspect ratio of the coarse particle size component in the alumina product of Example 1.
Figure 15:
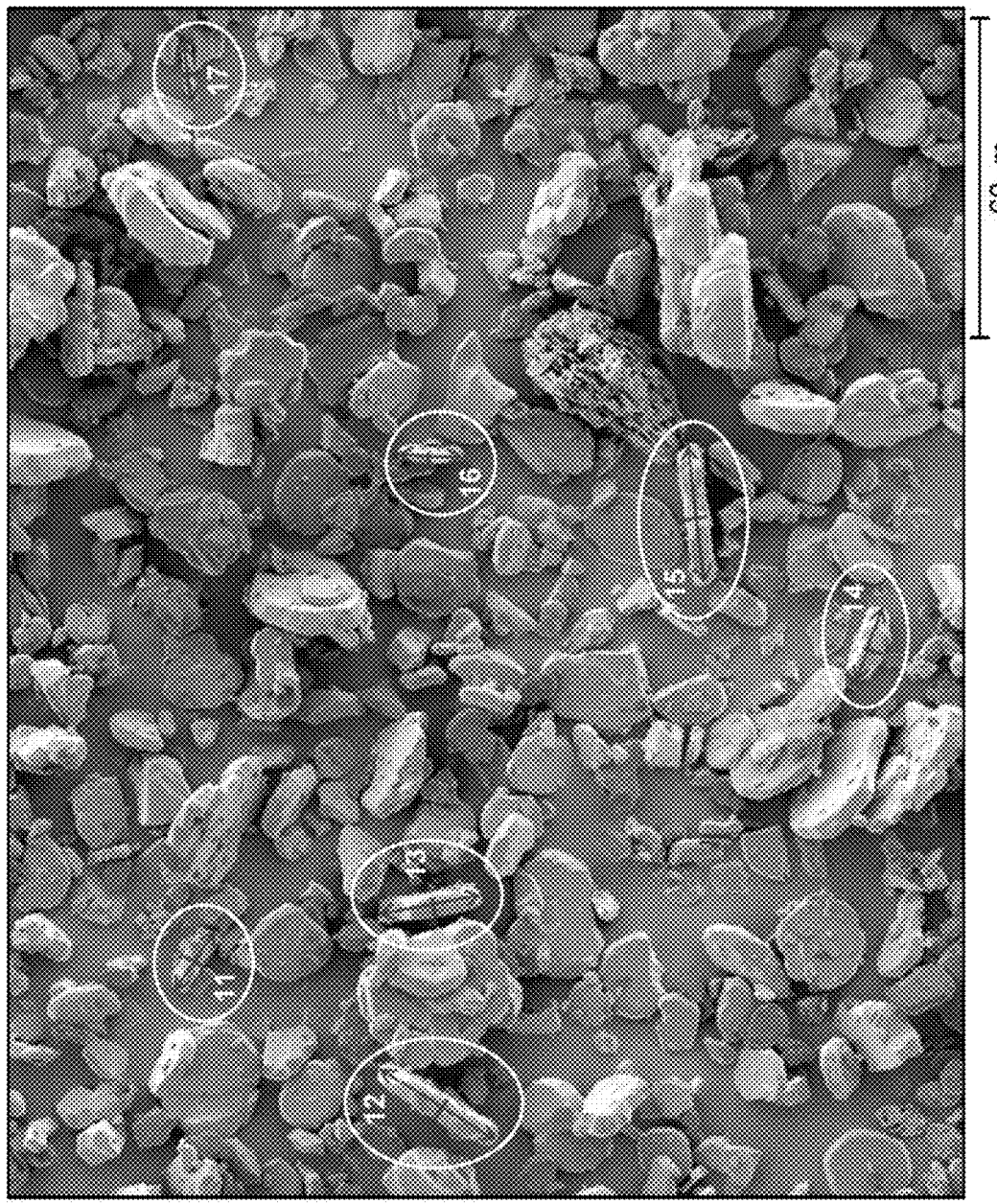
Figure 16:
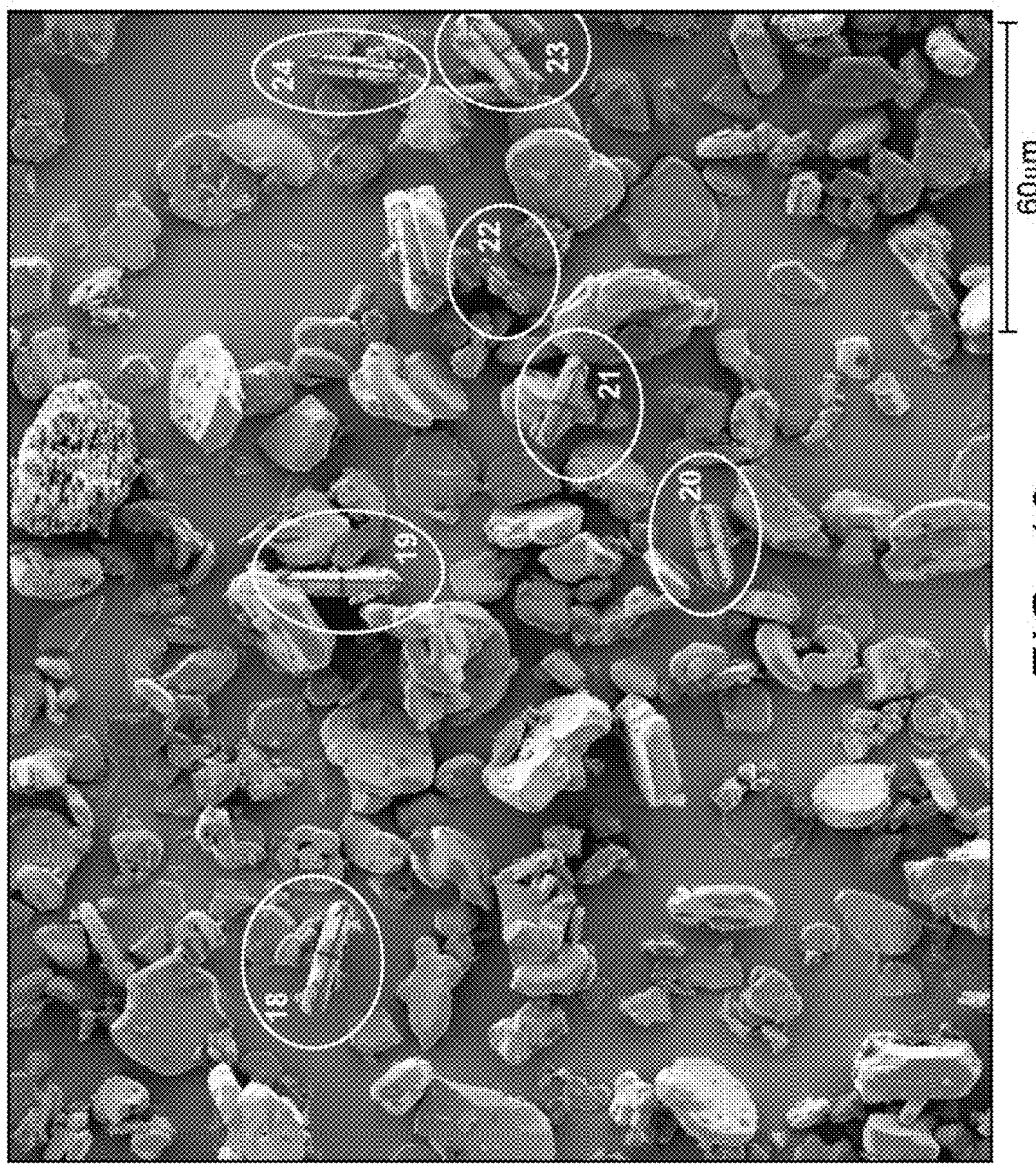
Figure 17:
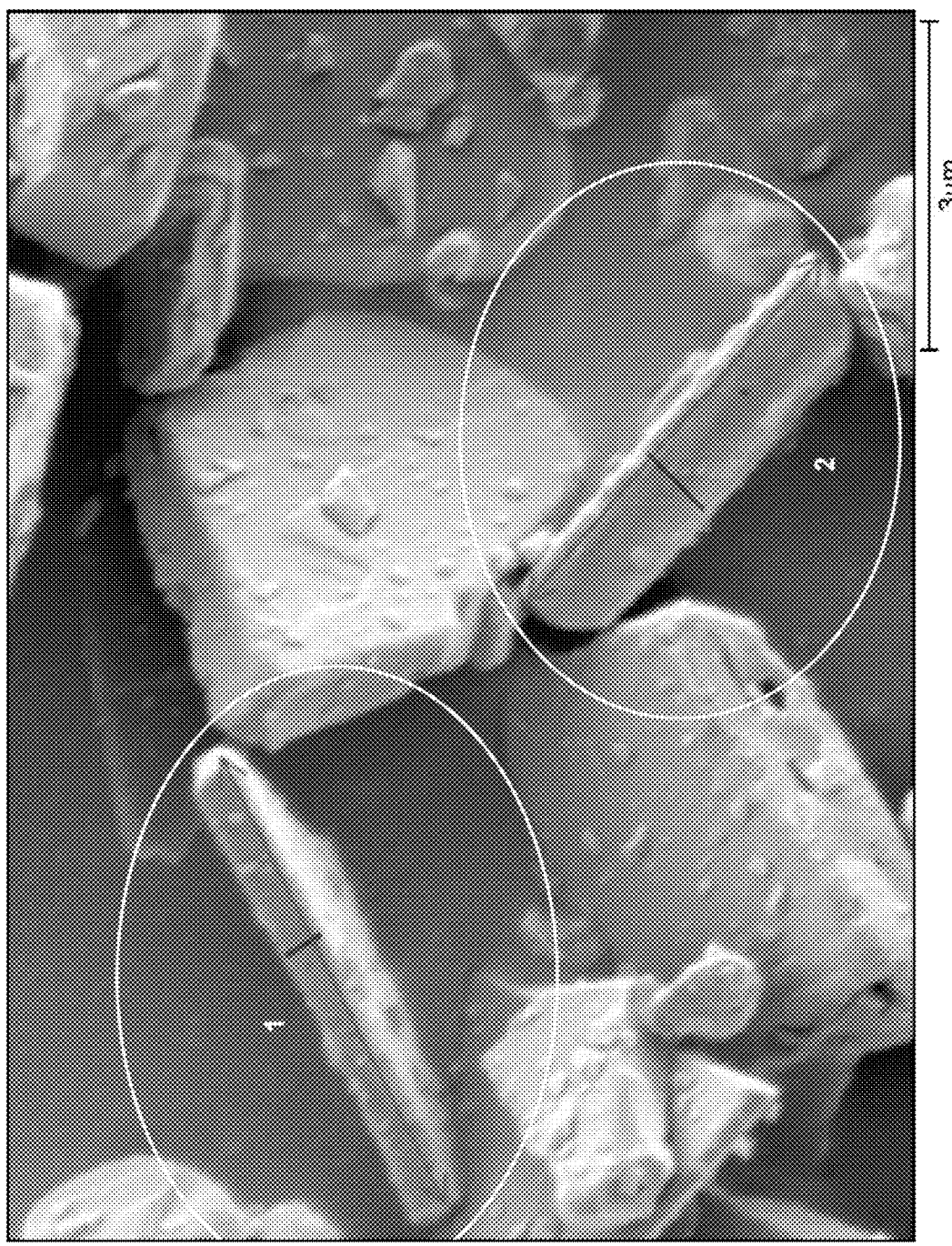
FIGS. 17-20 present scanning electron micrographs used for the determination of the average aspect ratio of the fine particle size component in the alumina product of Example 2.
Figure 18:
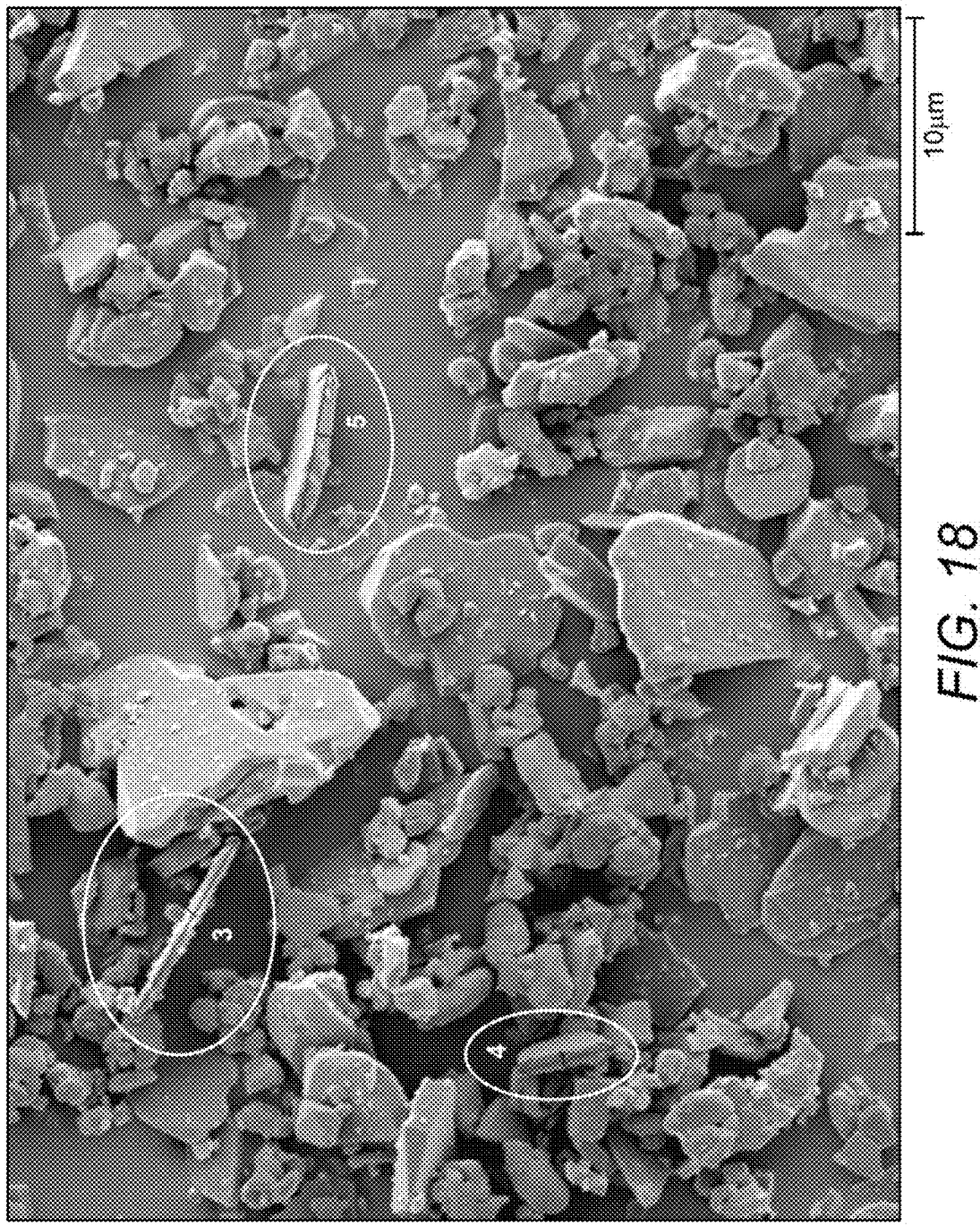
Figure 19:
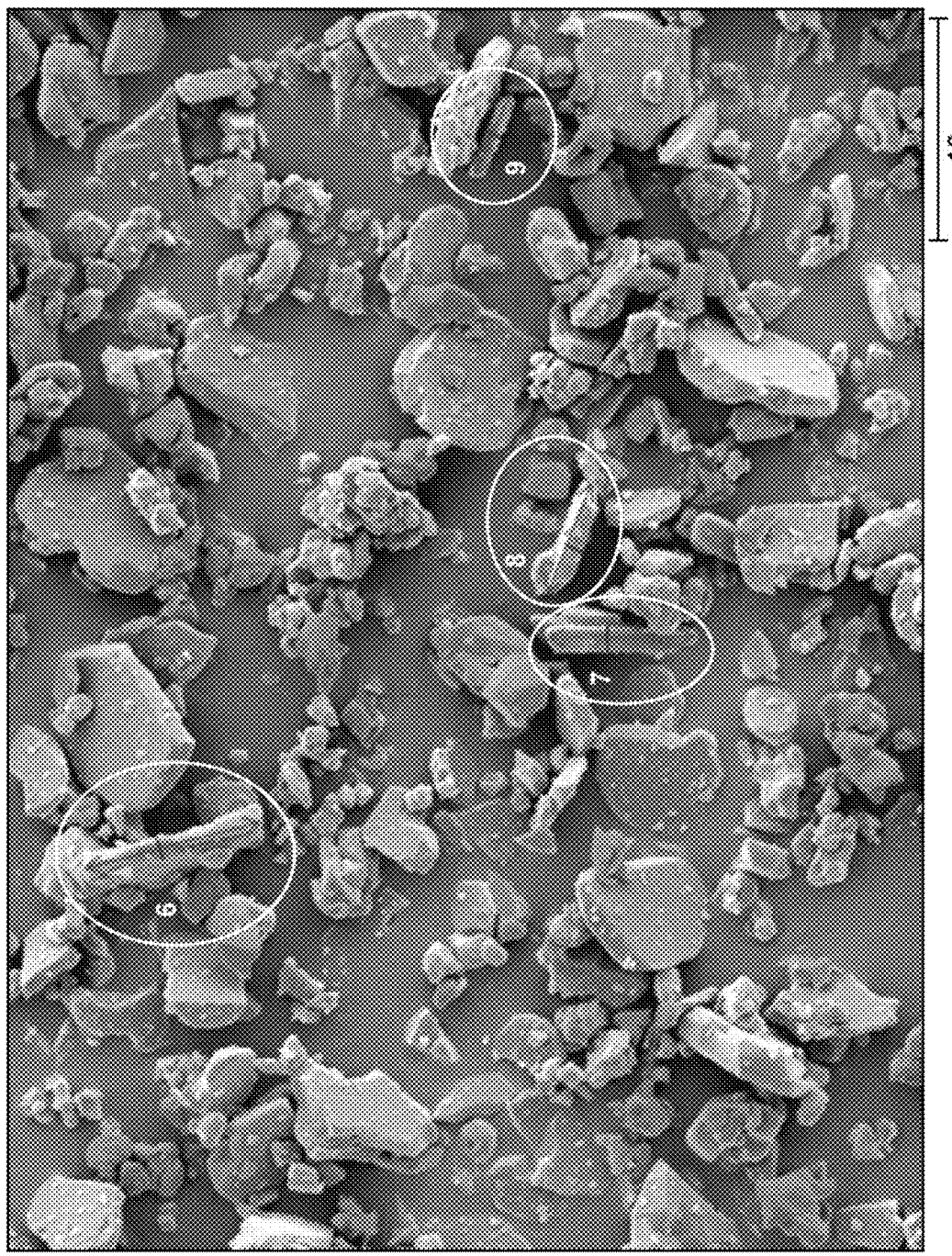
Figure 20:
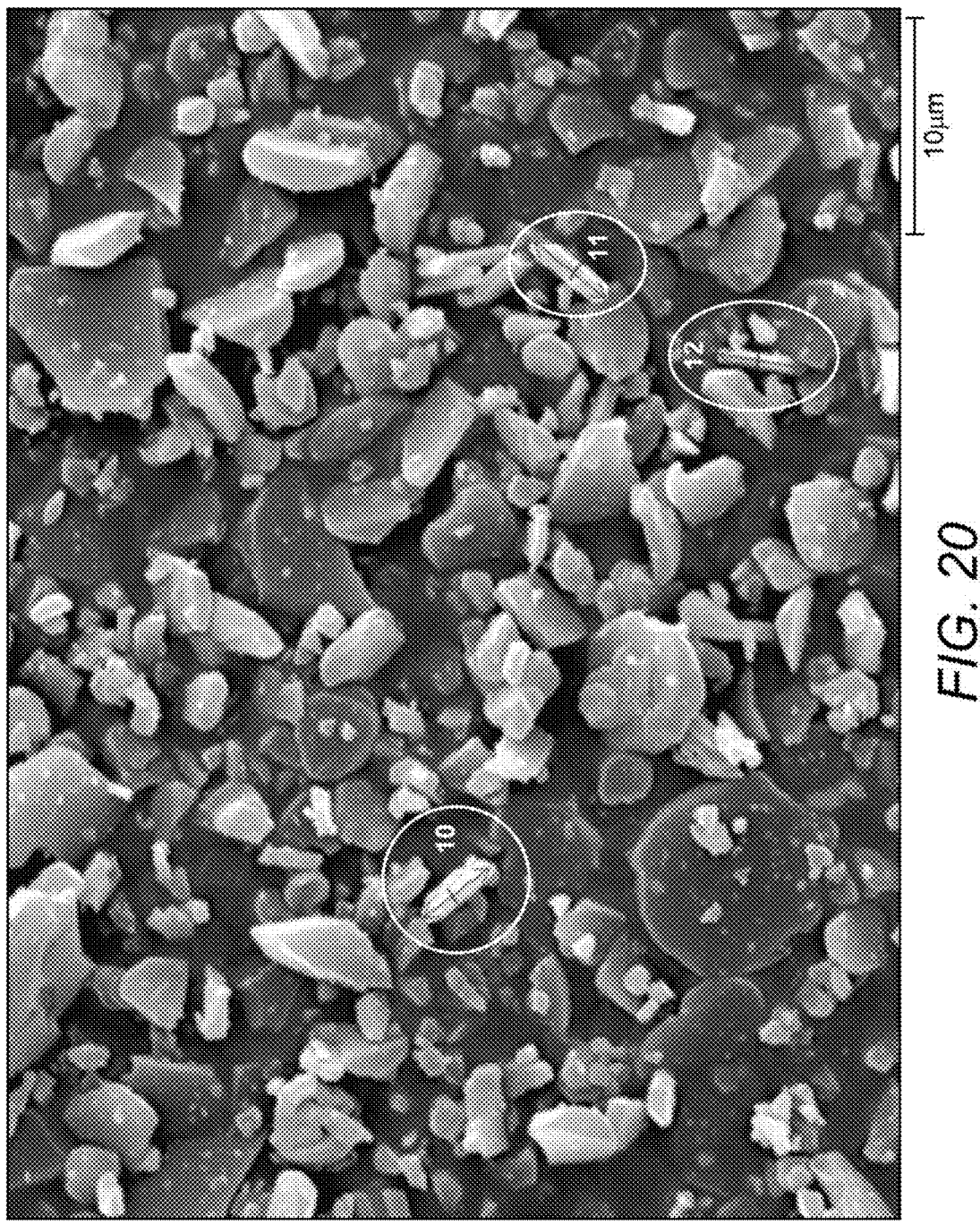

Following is the procedure used for determining the average aspect ratio of the coarse particle size component. Several SEM photographs were taken of samples of the coarse particle size component of Example 1 (see FIGS. 14-16). The number of SEM images should be an amount sufficient to allow for a minimum of 10 to a maximum of 25 particles to be measured. The particles to be measured are those that are oriented vertically (+/−10°), such that (1) the thickness of the particle can be measured and (2) the longest measurable dimension of the particle can be measured. As one of skill in the art would readily recognize, only two dimensions of these three-dimensional particles can be seen in the SEM image, and quantified. For the coarse particle size component, particles to be selected are those that are in the D30-D90 range, thus eliminating broken particles or small particle fragments caused by milling. For the coarse particle size component of Example 1, twenty-four (24) particles were measured, as shown in FIGS. 14-16. The aspect ratio ranged from 3.4:1 to 7:1, with an average of approximately 5:1, as summarized in the table below.

| Particle | Thickness (µm) | Length (µm) | Aspect Ratio |
| --- | --- | --- | --- |
| 1 | 3.1 | 14.5 | 4.6 |
| 2 | 4.4 | 17.4 | 4.0 |
| 3 | 4.5 | 18.2 | 4.0 |
| 4 | 5.4 | 27.2 | 5.0 |
| 5 | 3.1 | 14.6 | 4.7 |
| 6 | 5.4 | 24.0 | 4.5 |
| 7 | 2.9 | 18.3 | 6.3 |

-continued

| Particle | Thickness (μm) | Length (μm) | Aspect Ratio |
|---|---|---|---|
| 8 | 2.6 | 12.7 | 4.8 |
| 9 | 2.8 | 9.9 | 3.5 |
| 10 | 3.0 | 10.7 | 3.5 |
| 11 | 4.0 | 13.5 | 3.4 |
| 12 | 4.4 | 24.0 | 5.4 |
| 13 | 3.5 | 18.2 | 5.2 |
| 14 | 3.3 | 14.6 | 4.4 |
| 15 | 3.7 | 26.0 | 7.0 |
| 16 | 2.1 | 11.6 | 5.4 |
| 17 | 2.0 | 11.4 | 5.6 |
| 18 | 4.0 | 22.3 | 5.6 |
| 19 | 3.4 | 22.8 | 6.6 |
| 20 | 3.6 | 17.2 | 4.8 |
| 21 | 4.1 | 18.2 | 4.4 |
| 22 | 2.3 | 13.5 | 6.0 |
| 23 | 3.3 | 20.2 | 6.1 |
| 24 | 2.8 | 18.6 | 6.8 |

The procedure for determining the average aspect ratio for the fine particle size component is substantially the same as for the coarse particle size component, with the exception being that the particles to be selected are those that are in the D40-D90 range, to eliminate broken particles or small particle fragments caused by milling, as well as very small particles that are difficult to measure accurately. For the fine particle size component of Example 2, several SEM photographs were taken of samples of the fine particle size component (see FIGS. 17-20). Twelve (12) particles were measured, as shown in FIGS. 17-20. The aspect ratio ranged from 4.7:1 to 11.5:1, with an average of approximately 7:1, as summarized in the table below.

| Particle | Thickness (μm) | Length (μm) | Aspect Ratio |
|---|---|---|---|
| 1 | 0.4 | 3.8 | 10.3 |
| 2 | 0.7 | 4.1 | 5.7 |
| 3 | 0.8 | 9.6 | 11.5 |
| 4 | 0.8 | 4.7 | 6.2 |
| 5 | 0.8 | 7.7 | 9.3 |
| 6 | 1.0 | 8.3 | 8.3 |
| 7 | 1.1 | 6.8 | 6.4 |
| 8 | 0.9 | 5.4 | 6.3 |
| 9 | 0.6 | 4.0 | 6.3 |
| 10 | 0.7 | 4.1 | 5.5 |
| 11 | 0.7 | 4.3 | 6.1 |
| 12 | 0.9 | 4.5 | 4.7 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An alumina product having a fine particle size component and a coarse particle size component, wherein the alumina product has:
a d50 particle size in a range from about 1 to about 20 μm; and
a d90 particle size in a range from about 5 to about 50 μm.

Aspect 2. An alumina product having a fine particle size component and a coarse particle size component, wherein:
the fine particle size component has a d50 particle size in a range from about 0.3 to about 6 μm;
the coarse particle size component has a d50 particle size in a range from about 3 to about 35 μm; and
the amount of the fine particle size component in the alumina product is from about 10 to about 90 wt. %, based on the total weight of the fine particle size component and the coarse particle size component.

Aspect 3. The alumina product defined in aspect 1 or 2, wherein the alumina product is characterized by any suitable median particle size (d50), or a median particle size (d50) in any range disclosed herein, e.g., from about 1 to about 20 μm, from about 1 to about 10 μm, from about 2 to about 10 μm, from about 1 to about 5 μm, from about 1.5 to about 5 μm, or from about 1.5 to about 4.5 μm.

Aspect 4. The alumina product defined in any one of the preceding aspects, wherein the alumina product is characterized by any suitable d90 particle size, or a d90 particle size in any range disclosed herein, e.g., from about 5 to about 50 μm, from about 6 to about 40 μm, from about 6 to about 30 μm, from about 15 to about 40 μm, from about 16 to about 30 μm, or from about 16 to about 28 μm.

Aspect 5. The alumina product defined in any one of the preceding aspects, wherein the fine particle size component is characterized by any suitable median particle size (d50), or a median particle size (d50) in any range disclosed herein, e.g., from about 0.3 to about 6 μm, from about 0.5 to about 5 μm, from about 0.5 to about 4 μm, from about 0.8 to about 3.5 μm, or from about 1.5 to about 4.5 μm.

Aspect 6. The alumina product defined in any one of the preceding aspects, wherein the coarse particle size component is characterized by any suitable median particle size (d50), or a median particle size (d50) in any range disclosed herein, e.g., from about 3 to about 35 μm, from about 5 to about 25 μm, from about 8 to about 22 μm, from about 10 to about 30 μm, or from about 12 to about 22 μm.

Aspect 7. The alumina product defined in any one of the preceding aspects, wherein the amount of the fine particle size component in the alumina product is in any suitable range, or any range disclosed herein, e.g., from about 10 to about 90 wt. %, from about 20 to about 80 wt. %, from about 30 to about 80 wt. %, from about 40 to about 80 wt. %, from about 50 to about 80 wt. %, from about 30 to about 70 wt. %, from about 40 to about 70 wt. %, from about 40 to about 60 wt. %, from about 45 to about 75 wt. %, or from about 45 to about 65 wt. %, based on the total weight of the fine particle size component and the coarse particle size component.

Aspect 8. The alumina product defined in any one of the preceding aspects, wherein the alumina product is further characterized by any suitable maximum d100 particle size, or any maximum d100 particle size disclosed herein, e.g., less than or equal to about 100 μm, less than or equal to about 75 μm, less than or equal to 60 μm, or less than or equal to about 50 μm.

Aspect 9. The alumina product defined in any one of the preceding aspects, wherein the fine particle size component is further characterized by any suitable d90 particle size, or a d90 particle size in any range disclosed herein, e.g., from about 1.5 to about 25 μm, from about 2 to about 20 μm, from about 2 to about 18 μm, or from about 3 to about 16 μm.

Aspect 10. The alumina product defined in any one of the preceding aspects, wherein the coarse particle size component is further characterized by any suitable d90 particle size, or a d90 particle size in any range disclosed herein, e.g., from about 15 to about 65 μm, from about 20 to about 60 μm, from about 20 to about 55 μm, or from about 25 to about 50 μm.

Aspect 11. The alumina product defined in any one of the preceding aspects, wherein the fine particle size component is further characterized by any suitable BET surface area, or a BET surface area in any range disclosed herein, e.g., from about 0.5 to about 10 m$^2$/g, from about 0.5 to about 8 m$^2$/g, from about 1 to about 8 m$^2$/g, or from about 0.8 to about 5 m$^2$/g.

Aspect 12. The alumina product defined in any one of the preceding aspects, wherein the coarse particle size component is further characterized by any suitable BET surface area, or a BET surface area in any range disclosed herein, e.g., from about 0.1 to about 1.5 m$^2$/g, from about 0.2 to about 1 m$^2$/g, from about 0.25 to about 1.5 m$^2$/g, or from about 0.25 to about 1 m$^2$/g.

Aspect 13. The alumina product defined in any one of the preceding aspects, wherein the alumina product is further characterized by any suitable tapped density, or a tapped density in any range disclosed herein, e.g., from about 1,600 to about 2,500 kg/m$^3$, from about 1,700 to about 2,500 kg/m$^3$, from about 1,800 to about 2,400 kg/m$^3$, or from about 1,800 to about 2,300 kg/m$^3$.

Aspect 14. The alumina product defined in any one of the preceding aspects, wherein the alumina product (and/or the fine particle size component, and/or the coarse particle size component) is further characterized by any suitable α-alumina content, or an α-alumina content in any range disclosed herein, e.g., from about 80 to 100 wt. %, from about 90 to 100 wt. %, from about 95 to 100 wt. %, from about 85 to about 99 wt. %, or from about 90 to about 99 wt. %.

Aspect 15. The alumina product defined in any one of the preceding aspects, wherein the alumina product comprises calcined alumina (i.e., calcined alumina particles).

Aspect 16. The alumina product defined in any one of the preceding aspects, wherein the alumina product comprises surface treated alumina (i.e., surface treated alumina particles), with any suitable amount of the surface treatment, or any surface treatment amount disclosed herein, e.g., from about 0.05 to about 5 wt. %, or from about 0.1 to about 1 wt. %, based on the weight of the alumina product.

Aspect 17. The alumina product defined in any one of the preceding aspects, wherein the alumina product comprises surface treated alumina (i.e., surface treated alumina particles), wherein the surface treatment comprises any suitable surface treatment, or any surface treatment disclosed herein, e.g., silane treated alumina, fatty acid treated alumina, etc., or any combination thereof.

Aspect 18. The alumina product defined in any one of the preceding aspects, wherein the alumina product (and/or the fine particle size component, and/or the coarse particle size component) is further characterized by any suitable average aspect ratio, or an average aspect ratio in any range disclosed herein, e.g., from about 1.5:1 to about 30:1, from about 2:1 to about 15:1, from about 2.5:1 to about 15:1, from about 3:1 to about 12:1, or from about 4:1 to about 8:1.

Aspect 19. The alumina product defined in any one of the preceding aspects, wherein the alumina product (and/or the fine component, and/or the coarse component) comprises irregular and non-spherical particles characterized by any suitable average sphericity (or roundness), or an average sphericity (or roundness) in any range disclosed herein, e.g., less than or equal to about 0.7, less than or equal to about 0.6, less than or equal to about 0.5.

Aspect 20. The alumina product defined in any one of the preceding aspects, wherein the alumina product further comprises any suitable synergist compound, or any synergist compound disclosed herein, e.g., boron nitride, silicon nitride, aluminium nitride, magnesium oxide, graphite, or any flame retardant (e.g., aluminium hydroxide, magnesium hydroxide, or a phosphorus/nitrogen-containing flame retardant), etc., or any combination thereof, at any suitable amount, or any amount disclosed herein, e.g., from about 0.5 to about 30 wt. %, from about 1 to about 25 wt. %, or from about 1 to about 20 wt. %, based on the weight of the alumina product.

Aspect 21. A polymer composition (formulation, composite) comprising:
 (a) a polymer; and
 (b) the alumina product defined in any one of the preceding aspects.

Aspect 22. The polymer composition defined in aspect 21, wherein the polymer comprises any suitable polymer, or any polymer disclosed herein, e.g., a thermoplastic, a thermoset, or a combination thereof.

Aspect 23. The polymer composition defined in aspect 21, wherein the polymer comprises an epoxy, an acrylic, an ester, a urethane, a silicone, a phenolic, etc., or a combination thereof.

Aspect 24. The polymer composition defined in aspect 21, wherein the polymer comprises a polyethylene (e.g., a homopolymer or ethylene-based copolymer), a polypropylene, a polybutylene terephthalate, an acrylonitrile butadiene styrene (ABS), a polyamide, a polyimide, a polystyrene, a polycarbonate, an ethylene-vinyl acetate (EVA) copolymer, a polyolefin-styrene, etc., or a combination thereof.

Aspect 25. The polymer composition defined in aspect 21, wherein the polymer comprises a rubber and/or an elastomer based upon a nitrile, a butadiene, isobutylene, isoprene, a styrene butadiene, etc., or a combination thereof.

Aspect 26. The polymer composition defined in any one of aspects 21-25, wherein the amount of the alumina product, based on the total polymer composition, is any suitable amount, or an amount in any range disclosed herein, e.g., from about 10 to about 93 wt. %, from about 80 to about 93 wt. %, or from about 80 to about 92 wt. %.

Aspect 27. The polymer composition defined in any one of aspects 21-26, wherein the amount of the alumina product, based on the total polymer composition, is any suitable amount, or an amount in any range disclosed herein, e.g., from about 15 to about 75 vol. %, from about 47 to about 74 vol. %, from about 48 to about 73 vol. %, or from about 50 to about 70 vol. %.

Aspect 28. The polymer composition defined in any one of aspects 21-27, wherein the polymer composition has any suitable isotropic thermal conductivity, or an isotropic thermal conductivity in any range disclosed herein, e.g., from about 0.5 to about 10 W/m·K (watts per meter kelvin), from about 0.5 to about 8 W/m·K, from about 1 to about 6 W/m·K, from about 1 to about 5 W/m·K, or from about 1 to about 3 W/m·K.

Aspect 29. The polymer composition defined in any one of aspects 21-28, wherein the polymer composition has a viscosity that is less than that of a polymer composition containing an irregular (non-spherical) alumina product having different particle size characteristics.

Aspect 30. The polymer composition defined in any one of aspects 21-29, wherein the alumina product is surface treated, and the polymer composition has a viscosity that is substantially independent of shear rate, e.g., the viscosity is substantially the same or constant (+/−10%) over a shear rate range from 5 to 20 sec$^{-1}$, from 10 to 20 sec$^{-1}$, or from 5 to 15 sec$^{-1}$.

Aspect 31. The polymer composition defined in any one of aspects 21-30, wherein the alumina product is surface treated, and the polymer composition has a viscosity in a range from about 5,000 to about 15,000 mPa-sec, from about 5,000 to about 10,000 mPa-sec, from about 6,000 to about 12,000 mPa-sec, or from about 6,000 to about 9,000 mPa-sec, at a shear rate of 5 sec$^{-1}$, or 10 sec$^{-1}$, or 15 sec$^{-1}$.

Aspect 32. The polymer composition defined in any one of aspects 21-31, wherein the alumina product is untreated, and the polymer composition has a viscosity in a range from about 9,000 to about 30,000 mPa-sec, from about 9,000 to about 25,000 mPa-sec, from about 10,000 to about 22,000 mPa-sec, or from about 10,500 to about 18,000 mPa-sec, at a shear rate of 5 sec$^{-1}$, or 10 sec$^{-1}$, or 15 sec$^{-1}$.

Aspect 33. The polymer composition defined in any one of aspects 21-32, wherein the polymer composition has an elongation at break that is greater than that of a polymer composition containing a spherical alumina product having the same particle size characteristics.

Aspect 34. The polymer composition defined in any one of aspects 21-33, wherein the polymer composition has an elongation at break that is greater than that of a polymer composition containing an irregular (non-spherical) alumina product having different particle size characteristics.

Aspect 35. The polymer composition defined in any one of aspects 21-34, wherein the polymer composition has an elongation at break in a range from about 500 to about 1000%, or from about 600 to about 900%.

Aspect 36. The polymer composition defined in any one of aspects 21-35, wherein the polymer composition has a time to ignition that is greater than that of a polymer composition containing a spherical alumina product having the same particle size characteristics.

Aspect 37. The polymer composition defined in any one of aspects 21-36, wherein the polymer composition has a time to ignition that is greater than that of a polymer composition containing an irregular (non-spherical) alumina product having different particle size characteristics.

Aspect 38. The polymer composition defined in any one of aspects 21-37, wherein the polymer composition has an isotropic thermal conductivity that is greater than that of a polymer composition containing a spherical alumina product having the same particle size characteristics.

Aspect 39. The polymer composition defined in any one of aspects 21-38, wherein the polymer composition has an isotropic thermal conductivity that is greater than that of a polymer composition containing an irregular (non-spherical) alumina product having different particle size characteristics.

Aspect 40. An article of manufacture comprising the polymer composition defined in any one of aspects 21-39.

Aspect 41. The article defined in aspect 40, wherein the article comprises a gel, paste, or coating.

Aspect 42. The article defined in aspect 40, wherein the article comprises a sheet or film.

Aspect 43. The article defined in aspect 40, wherein the article comprises an electronic component (e.g., a semiconductor device, a circuit board, etc.).

Aspect 44. The article defined in aspect 40, wherein the article comprises functional sheets, IC packages, heat sinks, electrical power appliances, tapes, pads, thermal gap fillers, encapsulation compounds, adhesives, greases, sealing materials, coatings, $SF_6$ gas circuit breakers, solar panels, etc.

The invention claimed is:
1. A polymer composition comprising:
(a) a polymer; and
(b) an alumina product having a fine alumina particle size component and a coarse alumina particle size component, wherein:

the fine alumina particle size component has a d50 particle size in a range from 0.3 to 6 μm;
the coarse alumina particle size component has a d50 particle size in a range from 7 to 35 μm, and is characterized by an average aspect ratio in a range from 2.5 to 15; and
the amount of the fine alumina particle size component in the alumina product is from 10 to 90 wt. %, based on the total weight of the fine alumina particle size component and the coarse alumina particle size component.

2. The polymer composition of claim 1, wherein the polymer composition has an isotropic thermal conductivity in a range from 0.5 to 8 W/m·K.

3. The polymer composition of claim 1, wherein the polymer composition has an isotropic thermal conductivity in a range from 1 to 5 W/m·K.

4. The polymer composition of claim 1, wherein:
the polymer comprises a thermoplastic polymer; and
the amount of the alumina product, based on the total polymer composition, is in a range from 80 to 93 wt. %.

5. The polymer composition of claim 1, wherein:
the polymer comprises a thermoset polymer; and
the amount of the alumina product, based on the total polymer composition, is in a range from 47 to 74 vol. %.

6. The polymer composition of claim 1, wherein:
the polymer comprises a polyether polyol;
the alumina product is surface treated;
the amount of the alumina product, based on the total polymer composition, is 72 wt. %; and
the polymer composition is characterized by:
a viscosity in a range from 6,000 to 12,000 mPa-sec at a shear rate of 10 sec$^{-1}$; and
a viscosity that is substantially constant over a shear rate range from 10 to 20 sec$^{-1}$.

7. The polymer composition of claim 1, wherein:
the polymer comprises a polyolefin elastomer;
the amount of the alumina product, based on the total polymer composition, is 80 wt. %; and
the polymer composition is characterized by an elongation at break in a range from 500 to 1000%.

8. The polymer composition of claim 1, wherein:
the polymer comprises 75 wt. % EVA and 25 wt. % polyethylene;
the amount of the alumina product, based on the total polymer composition, is 80 wt. %; and
the polymer composition is characterized by:
a time to ignition that is greater than that of a polymer composition containing a spherical alumina product having the same particle size characteristics as that of the alumina product; and/or
a time to ignition that is greater than that of a polymer composition containing an irregular alumina product having different particle size characteristics from that of the alumina product.

9. The polymer composition of claim 1, wherein:
the fine alumina particle size component has a d50 particle size in a range from 1 to 5 μm, and is characterized by a BET surface area in a range from 0.8 to 5 m$^2$/g;
the coarse alumina particle size component has a d50 particle size in a range from 10 to 30 μm, and is characterized by a BET surface area in a range from 0.2 to 1 m$^2$/g; and
the amount of the fine alumina particle size component in the alumina product is from 20 to 80 wt. %, based on the total weight of the fine alumina particle size component and the coarse alumina particle size component.

10. The polymer composition of claim 9, wherein the alumina product comprises surface treated alumina particles, and wherein the alumina product comprises from 0.05 to 5 wt. % surface treatment, based on the weight of the alumina product.

11. The polymer composition of claim 9, wherein the alumina product has:
a d50 particle size in a range from 1.5 to 61 µm; and
a d90 particle size in a range from 7 to 35 µm.

12. The polymer composition of claim 9, wherein the polymer composition has an isotropic thermal conductivity in a range from 0.5 to 8 W/m·K.

13. The polymer composition of claim 9, wherein the average aspect ratio is in a range from 3 to 10.

14. The polymer composition of claim 1, wherein:
the fine alumina particle size component has a d50 particle size in a range from 1 to 4.5 µm, and is characterized by a BET surface area in a range from 0.8 to 4 m²/g;
the coarse alumina particle size component has a d50 particle size in a range from 12 to 30 µm, and is characterized by a BET surface area in a range from 0.25 to 1 m²/g; and
the amount of the fine alumina particle size component in the alumina product is from 40 to 80 wt. %, based on the total weight of the fine alumina particle size component and the coarse alumina particle size component.

15. The polymer composition of claim 14, wherein the average aspect ratio is in a range from 4 to 8.

16. The polymer composition of claim 1, wherein the amount of the alumina product, based on the total polymer composition, is in a range from 50 to 93 wt. %.

17. A polymer composition comprising:
(a) a polymer; and
(b) an alumina product consisting of a fine alumina particle size component and a coarse alumina particle size component, wherein:
the fine alumina particle size component has a d50 particle size in a range from 0.3 to 61 µm;
the coarse alumina particle size component has a d50 particle size in a range from 7 to 35 µm, and is characterized by an average aspect ratio in a range from 2.5 to 15; and
the amount of the fine alumina particle size component in the alumina product is from 10 to 90 wt. %, based on the total weight of the fine alumina particle size component and the coarse alumina particle size component.

18. The polymer composition of claim 17, wherein:
the fine alumina particle size component has a d50 particle size in a range from 1 to 51 µm, and is characterized by a BET surface area in a range from 0.8 to 5 m²/g;
the coarse alumina particle size component has a d50 particle size in a range from 10 to 30 µm, and is characterized by a BET surface area in a range from 0.2 to 1 m²/g; and
the amount of the fine alumina particle size component in the alumina product is from 20 to 80 wt. %, based on the total weight of the fine alumina particle size component and the coarse alumina particle size component.

19. The polymer composition of claim 18, wherein the alumina product comprises surface treated alumina particles, and wherein the alumina product comprises from 0.1 to 1 wt. % surface treatment, based on the weight of the alumina product.

20. The polymer composition of claim 18, wherein the alumina product has:
a d50 particle size in a range from 1.5 to 6 µm; and
a d90 particle size in a range from 7 to 35 µm.

21. The polymer composition of claim 18, wherein the polymer composition has an isotropic thermal conductivity in a range from 0.5 to 8 W/m·K.

22. The polymer composition of claim 18, wherein the average aspect ratio is in a range from 3 to 10.

23. The polymer composition of claim 17, wherein:
the fine alumina particle size component has a d50 particle size in a range from 1 to 4.5 µm, and is characterized by a BET surface area in a range from 0.8 to 4 m²/g;
the coarse alumina particle size component has a d50 particle size in a range from 12 to 30 µm, and is characterized by a BET surface area in a range from 0.25 to 1 m²/g; and
the amount of the fine alumina particle size component in the alumina product is from 40 to 80 wt. %, based on the total weight of the fine alumina particle size component and the coarse alumina particle size component.

24. The polymer composition of claim 17, wherein the amount of the alumina product, based on the total polymer composition, is in a range from 50 to 93 wt. %.

25. An article of manufacture comprising the polymer composition of claim 1.

26. The article of claim 25, wherein the article comprises an electronic component.

27. An article of manufacture comprising the polymer composition of claim 9.

28. An article of manufacture comprising the polymer composition of claim 14.

29. An article of manufacture comprising the polymer composition of claim 17.

* * * * *

UNITED STATES PATENT AND TRADEMARK OFFICE
CERTIFICATE OF CORRECTION

| | |
|---|---|
| PATENT NO. | : 11,912,584 B2 |
| APPLICATION NO. | : 17/183434 |
| DATED | : February 27, 2024 |
| INVENTOR(S) | : Bashar Diar Bakerly et al. |

It is certified that error appears in the above-identified patent and that said Letters Patent is hereby corrected as shown below:

In the Claims

Column 21, Line 10: "a d50 particle size in a range from 1.5 to 61 μm; and" should be changed to -- a d50 particle size in a range from 1.5 to 6 μm; and --

Column 21, Line 43: "particle size in a range from 0.3 to 61 μm;" should be changed to -- particle size in a range from 0.3 to 6 μm;" --

Column 22, Line 3: "particle size in a range from 1 to 51 μm, and is" should be changed to -- particle size in a range from 1 to 5 μm, and is --

Signed and Sealed this
Twenty-second Day of October, 2024

Katherine Kelly Vidal
*Director of the United States Patent and Trademark Office*